US012292528B2

(12) United States Patent
Overdevest et al.

(10) Patent No.: US 12,292,528 B2
(45) Date of Patent: May 6, 2025

(54) METHOD OF PROCESSING RADAR SIGNALLING

(71) Applicant: NXP B.V., Eindhoven (NL)

(72) Inventors: Jeroen Overdevest, Eindhoven (NL); Arie Geert Cornelis Koppelaar, Giessen (NL); Francesco Laghezza, Eindhoven (NL)

(73) Assignee: NXP B.V., Eindhoven (NL)

( * ) Notice: Subject to any disclaimer, the term of this patent is extended or adjusted under 35 U.S.C. 154(b) by 394 days.

(21) Appl. No.: 17/823,288

(22) Filed: Aug. 30, 2022

(65) Prior Publication Data

US 2023/0102833 A1  Mar. 30, 2023

(30) Foreign Application Priority Data

Sep. 29, 2021  (EP) ..................................... 21199975

(51) Int. Cl.
    *G01S 7/02*    (2006.01)
    *G01S 7/35*    (2006.01)
    *G01S 13/58*   (2006.01)

(52) U.S. Cl.
    CPC ............ *G01S 7/0232* (2021.05); *G01S 7/354* (2013.01); *G01S 7/356* (2021.05); *G01S 13/584* (2013.01)

(58) Field of Classification Search
    CPC ........ G01S 7/0232; G01S 7/356; G01S 7/354; G01S 13/584
    USPC ........................................................ 342/109
    See application file for complete search history.

(56) References Cited

U.S. PATENT DOCUMENTS

| 8,044,846 B1* | 10/2011 | Urkowitz | ............. | G01S 7/2923 |
| | | | | 342/134 |
| 2019/0302253 A1* | 10/2019 | Santra | ..................... | G01S 7/415 |
| 2020/0191939 A1* | 6/2020 | Wu | ......................... | G01S 7/354 |
| 2021/0209453 A1* | 7/2021 | Meissner | ................. | G06N 3/04 |

FOREIGN PATENT DOCUMENTS

| EP | 3244229 A1 | 11/2017 |
| EP | 3620810 A1 | 3/2020 |

OTHER PUBLICATIONS

Rameez et al. "Autoregressive Model-Based Signal Reconstruction for Automotive Radar Interference Mitigation," IEEE Sensors Journal, vol. 21, No. 5, Mar. 1, 2021, pp. 6575-6586 (Year: 2021).*

(Continued)

*Primary Examiner* — James R Hulka
*Assistant Examiner* — Samarina Makhdoom

(57) ABSTRACT

A method of processing radar signalling, the method comprising: receiving a mask (815) that represents samples in the radar signalling that are detected as including interference. The mask (815) comprises a matrix of data having a first dimension and a second dimension, wherein the first dimension represents a fast-time axis and the second dimension represents a slow-time axis. The method further comprises performing frequency analysis on the mask (815) across each of the fast-time axis and the slow-time axis of the mask in order to provide a range-Doppler processed mask (817); and deconvolving a range-Doppler map (813) of the received radar signalling using the range-Doppler processed mask (817) in order to provide a deconvolved-range-Doppler map (814).

20 Claims, 20 Drawing Sheets

(56) References Cited

OTHER PUBLICATIONS

Alhumaidi, M., "Interference Avoidance and Mitigation in Automotive Radar", 2020 17th European Radar Conference (EuRAD), Jan. 10-15, 2021.
Brandt, R., "Evaluation of Deconvolution Methods", https://fse.studenttheses.ub.rug.nl/17930/13/internshipbrandt.pdf., downloaded Aug. 8, 2022.
Krishnan, D., "Fast image deconvolution using hyperlaplacian priors", Advances in Neural Information Processing Systems 22, pp. 1033-1041. Curran Associates, Inc., Dec. 2009.
Laghezza, F., "Enhanced Interference Detection Method in Automotive FMCW Radar Systems", 2019 20th International Radar Symposium (IRS), Jun. 26, 2019.
Stove, A.G., "Linear FMCW radar techniques", IEEE Proceedings-F, vol. 139, No. 5, Oct. 1992.

\* cited by examiner

Sensing mode: BSD-B
Detection technique: adapt thr - fifo
Mitigation technique: null + deconvolution
Detections: 3

Distance: [5.0  15.0  25.0]
Velocity: [0.0  -36.0  43.2]
Az.: [0.0  3.6  -9.4]
El.: [90.0  88.2  90.0]
SNR: [32.6  31.9  31.4]

METHOD OF PROCESSING RADAR SIGNALLING

CROSS-REFERENCE TO RELATED APPLICATIONS

This application claims the priority under 35 U.S.C. § 119 of European Patent application no. 21199975.0, filed on 29 Sep. 2021, the contents of which are incorporated by reference herein.

FIELD

The present disclosure relates to methods and processors for processing radar signalling, and in particular to methods and processors that can mitigate the effects of interference on the radar signalling.

SUMMARY

According to a first aspect of the present disclosure there is provided a method of processing radar signalling, the method comprising:
  receiving a mask that represents samples in the radar signalling that are detected as including interference, wherein the mask comprises a matrix of data having a first dimension and a second dimension, wherein the first dimension represents a fast-time axis and the second dimension represents a slow-time axis;
  performing frequency analysis on the mask across each of the fast-time axis and the slow-time axis of the mask in order to provide a range-Doppler processed mask; and
  deconvolving a range-Doppler map of the received radar signalling using the range-Doppler processed mask in order to provide a deconvolved-range-Doppler map.

Advantageously, applying this deconvolution can reduce the significance of velocity artefacts, for example by reducing the amplitude of imperfections, and therefore result in fewer false detections of ghost/non-existent targets.

In one or more embodiments, performing the frequency analysis on the mask across the fast-time axis results in a range-processed-mask that has a first dimension and a second dimension, wherein the first dimension represents a distance axis and the second dimension represents the slow-time axis.

In one or more embodiments, performing the frequency analysis on the mask across the slow-time axis comprises performing the frequency analysis on the range-processed-mask for only a subset of the indices of the distance axis.

In one or more embodiments, the size of the subset is set according to a design parameter. The size of the subset may be one, three or five indices of the distance axis.

In one or more embodiments, performing the frequency analysis comprises the following steps, which can be performed in either order:
  applying a Fourier transform across the fast-time axis; and
  applying a Fourier transform across the slow-time axis.

In one or more embodiments, performing the frequency analysis comprises:
  applying a Fourier transform across the fast-time axis; and then
  applying a Fourier transform across the slow-time axis.

In one or more embodiments, the method further comprises:
  applying the mask to the radar signalling in order to provide interference-reduced-radar-signalling, wherein the interference-reduced-radar-signalling comprises a matrix of data having a first dimension and a second dimension, wherein the first dimension represents a fast-time axis and the second dimension represents a slow-time axis; and
  performing the same frequency analysis on the interference-reduced-radar-signalling across each of the respective first and second dimensions of the interference-reduced-radar-signalling in order to provide the range-Doppler map of the received radar signalling.

In one or more embodiments, the method further comprises:
  processing the mask to determine if there are at least a predetermined number of samples that include interference; and
  only continuing to perform the steps of performing frequency analysis on the mask and deconvolving the range-Doppler map if there are at least a predetermined number of samples that include interference.

In one or more embodiments, the method further comprises: processing the radar signalling to determine the mask.

In one or more embodiments, the mask is a Fading-in Fadingout mask or a binary mask.

In one or more embodiments, deconvolving the range-Doppler map comprises applying a one-dimensional or a two-dimensional deconvolution.

In one or more embodiments, deconvolving the range-Doppler map comprises applying a spectral dimensional deconvolution.

There is also disclosed a computer program configured to perform any method disclosed herein.

According to a further aspect of the present disclosure, there is provided a processor configured to:
  receive a mask that represents samples in radar signalling that are detected as including interference, wherein the mask comprises a matrix of data having a first dimension and a second dimension, wherein the first dimension represents a fast-time axis and the second dimension represents a slow-time axis;
  perform frequency analysis on the mask across each of the fast-time axis and the slow-time axis of the mask in order to provide a range-Doppler processed mask; and
  deconvolve a range-Doppler map of the received radar signalling using the range-Doppler processed mask in order to provide a deconvolved-range-Doppler map.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which.

DETAILED DESCRIPTION

Frequency-Modulated Continuous Wave (FMCW) radar-to-radar interference is likely to become an increasing challenge as more and more cars are being employed with FMCW radar sensors to sense the environment around the car. As the number of radar sensors equipped on a single car increases, the likelihood that radars will share similar time-frequency resources while spatially overlapping will rise significantly.

Without any coordination or standardization, the radar should adapt itself to mitigate and avoid interference from other radars. Digital signal processing techniques are highly effective to suppress the interference energy, even before range-Doppler processing. The interference can be detected in the time-domain (e.g. in samples from an ADC (analogue to digital converter)) and mitigated immediately after. A very cost-effective approach to cancel the interference is to set the interference impacted beat-signal samples (fast-time) to zero. However, the zeroing creates artefacts in the velocity gates of the range-Doppler map in case of very strong targets. The stronger the targets, the stronger these artefacts will be. The artefacts can be incorrectly detected as targets by a Constant False-Alarm Rate (CFAR) detector if they exceed the CFAR threshold. Therefore, these detections can be called ghost detections.

Examples disclosed herein can provide a technique that is independently run on top of conventional range-Doppler processing, with the benefit of reducing the number false detections significantly when interference has been mitigated.

Frequency modulated continuous wave (FMCW) is a waveform that is often used for automotive radar systems due to its accuracy and robustness. In particular, an implementation in which a sequence of short duration frequency chirps is transmitted has favorable properties with respect to the detection of objects moving with a non-zero relative radial velocity. A system using this waveform is described in: 'Linear FMCW radar Techniques', A. G. Stove, IEEE Proceedings-F, Vol. 139, No. 5, October 1992.

Figure 1A:
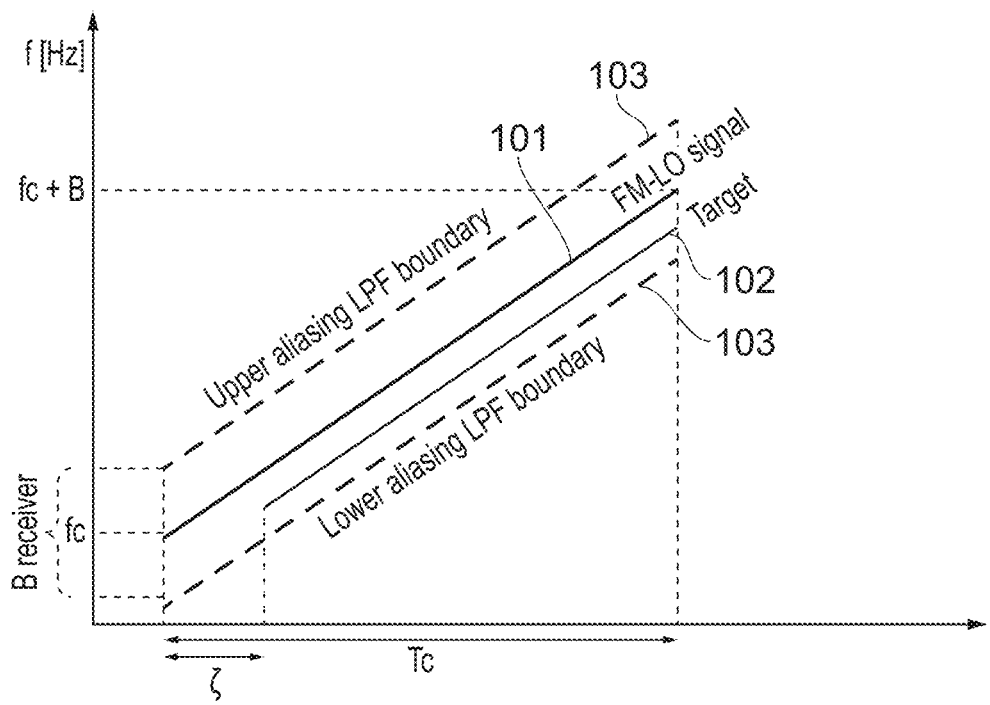
FIG. 1A shows a plot of radar signalling, with time on the horizontal axis and frequency on the vertical axis.

FIG. 1A shows a plot of radar signalling, with time on the horizontal axis and frequency on the vertical axis. The plot shows a transmitted FMCW chirp signal 101 and the received, reflected, signal 102. The dotted lines 103 represent the bandwidth of an anti-aliasing filter (AAF) where the IF (intermediate frequency) signal is confined before acquisition. The instantaneous frequency difference between the transmitted signal 101 and the received signal 102 is constant for the duration of a frequency ramp in this example.

The received signal 102 that is reflected from an object is delayed in time with respect to the transmitted signal 101. The time delay, which is visible in FIG. 1A, is due to the propagation time between the radar system and the reflecting object in the forward and backward direction. In an FMCW system a sine wave with an increasing or decreasing frequency is transmitted. In the down conversion operation, the transmitted signal is down-mixed with the time-delayed transmitted signal in the analog domain. In case the relative velocity between the radar system and the reflecting object is zero, the time delayed signal is an attenuated and phase rotated version of the transmitted signal.

The result of the down conversion operation is a sine wave oscillating at the so-called beat frequency. The frequency depends on the distance to the reflecting object D, the difference between the start and the stop frequency of the ramp ΔF, and the duration of the ramp $T_{ramp}$:

$$f_{beat} = \frac{\Delta F}{T_{ramp}} \frac{2D}{c_0} \tag{1}$$

where $c_0$ is equal to the speed of light.

In case the relative velocity is non-zero, the corresponding Doppler frequency is added to the beat frequency. The Doppler component will change the phase of the received frequency ramp.

A well-known technique, the two-dimensional Fast Fourier Transformation (FFT), can be used to calculate the distance and the relative radial velocity, respectively. In such FMCW radar systems, the relationship between the distance and the beat frequency is linear. The beat frequency increases with increasing distance to the reflecting object. In practice, multiple reflections can be present in the field of view of the radar system. In this case the output of the down conversion operation is a summation of sine waves oscillating at the beat frequencies corresponding to the distances to the reflecting objects.

Figure 1B:
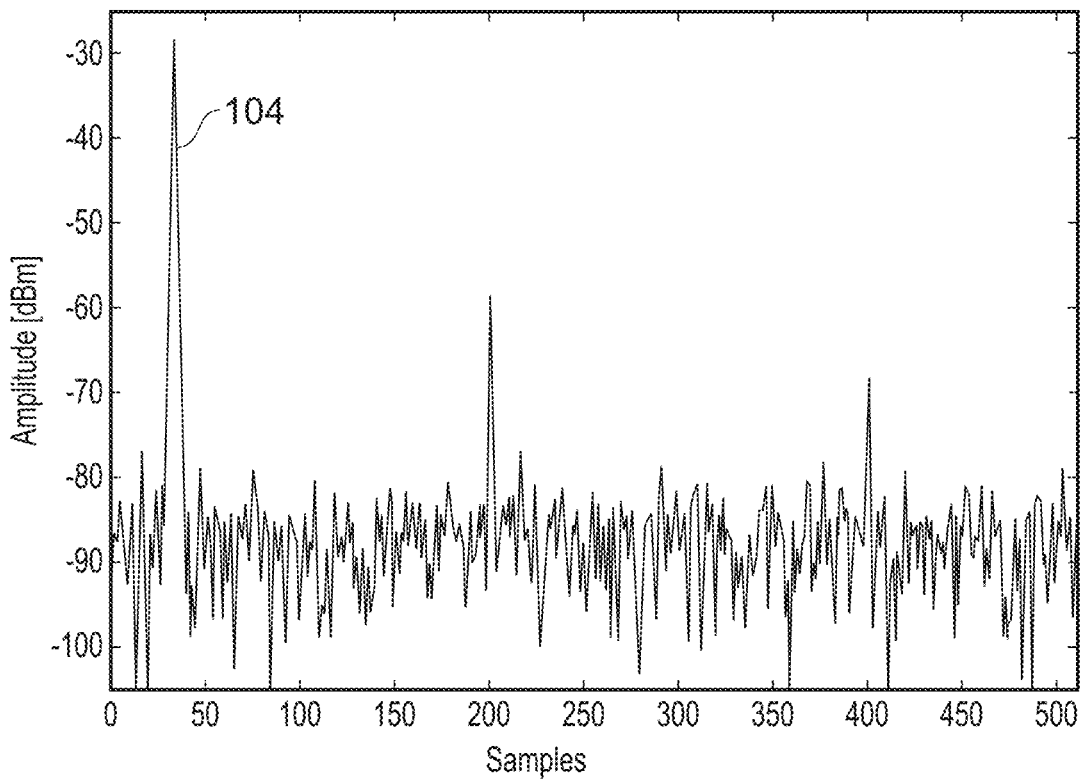
FIG. 1B shows an example of a radar range profile where three targets are present at difference distances.

FIG. 1B shows an example of a radar range profile 104 (after 2D-FFT processing) where three targets are present at difference distances. Each target is represented by a peak in the amplitude at a different sample value. In FIG. 1B the targets are at about samples 40, 200 and 400. The noise floor is mainly determined by the thermal noise (−174 dBm/Hz). As can be seen from FIG. 1B, using an anti-aliasing filer (AAF) with a cut-off frequency that matches the ADC sample rate determines the maximum beat frequency and consequently the maximum detectable range. Furthermore, the AAF also reduces the amount of unwanted noise and interference that is captured at the radio frequency (RF) carrier.

A Constant False-Alarm Rate (CFAR) detector compares the power of the reflected echoes with respect to the noise power. When no interference is present, the noise power is determined by the thermal noise floor (−174 dBm/Hz), the transceiver noise figure and the receiver bandwidth.

Figure 2A:
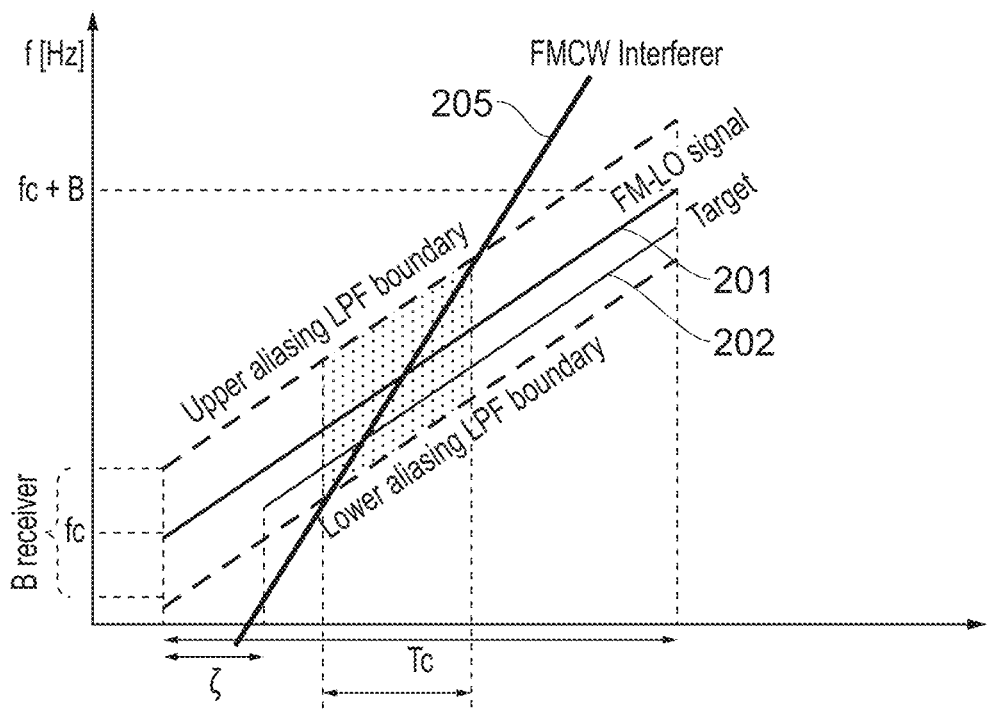
FIG. 2A shows a plot that is similar to that of FIG. 1A, but in FIG. 2A there is interference.

FIG. 2A shows a plot that is similar to that of FIG. 1A, but in FIG. 2A there is interference. FIG. 2a shows a transmitted FMCW chirp signal 201, a received, reflected, signal 202 and the FMCW signal from another radar 205 (which is interference for the radar system that transmits the FMCW chirp signal labelled as 201). The most likely type of interference is uncorrelated interference, which can occur when the victim and the interferer radar have different ramp slopes and different start/stop times, as shown in FIG. 2A.

Figure 2B:
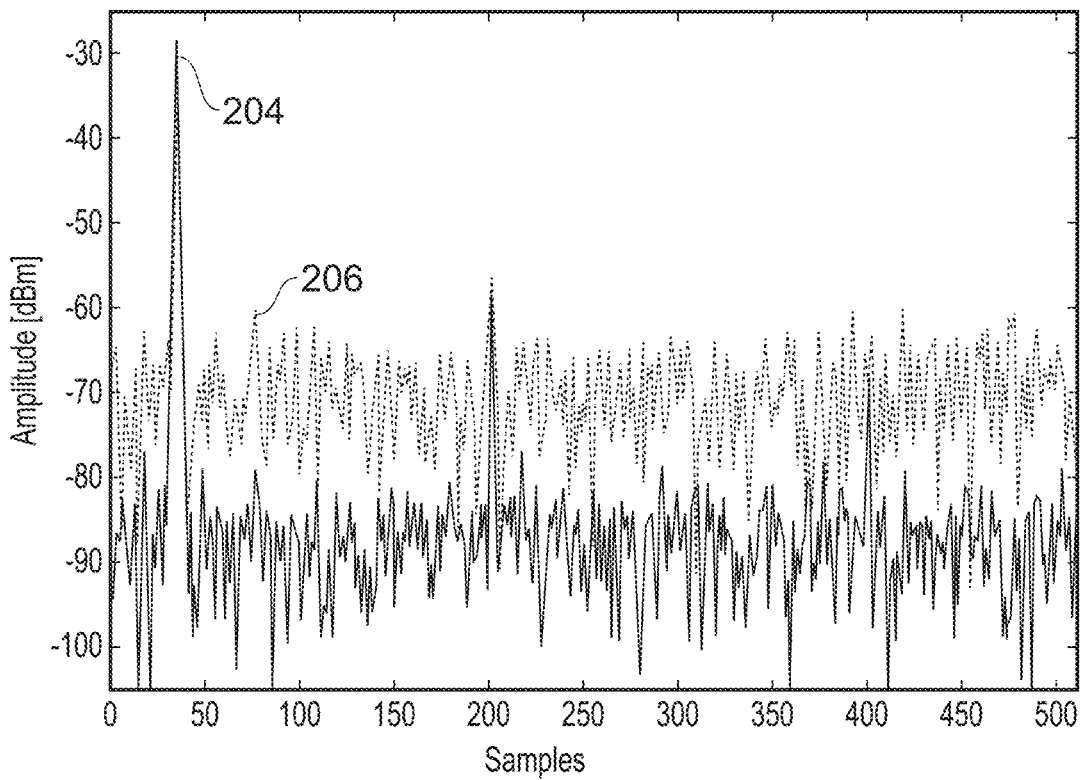
FIG. 2B shows the radar range profile for the signals of FIG. 2A, where an incoherent FMCW interferer is present.

FIG. 2B shows the radar range profile 206 for the signals of FIG. 2A, where an incoherent FMCW interferer is present. FIG. 2B also shows the radar range profile 204 for signals without interference from the FMCW signal from the other radar for comparison. FIG. 2B shows that the noise floor is drastically increased by the amount of the interference energy within the AAF bandwidth and as a result the weakest target (peak) is drowned in the noise.

Figure 3A:
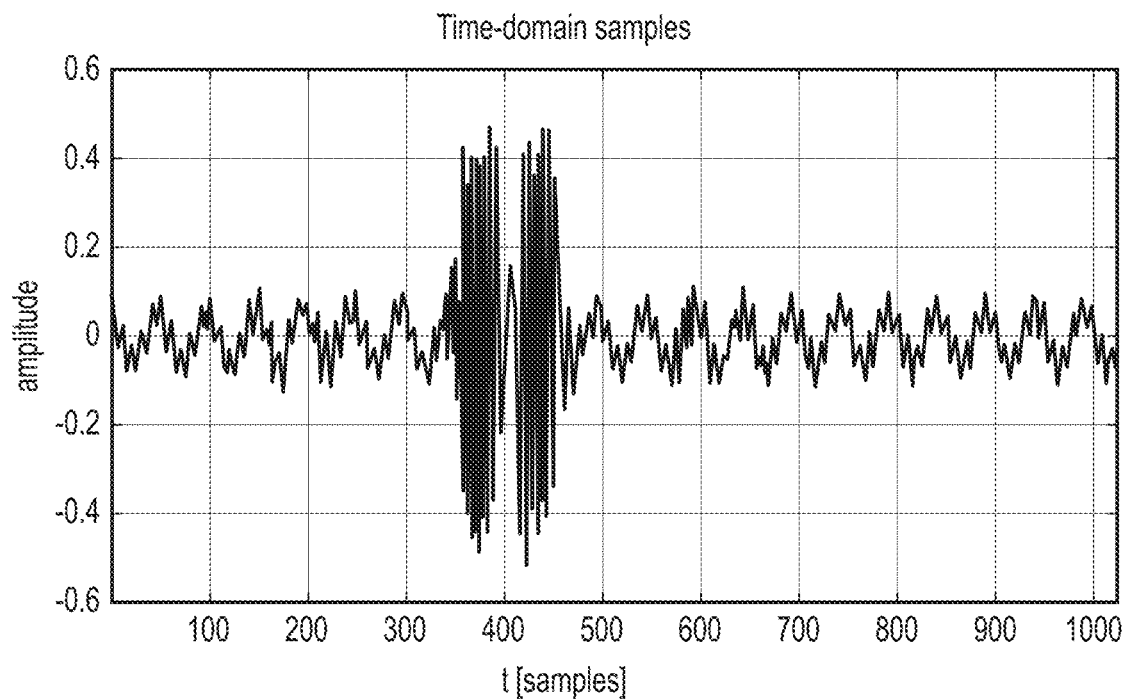
FIG. 3A illustrates a plot of an interfered beat signal of a single chirp in time-domain.

FIG. 3A illustrates a plot of an interfered beat signal of a single chirp in time-domain, with time (in samples) on the horizontal axis and amplitude on the vertical axis. It can be clearly observed that the interference presence is time limited, which indicates the effect of the AAF. In FIG. 3A, the interference due to another FMCW occurs in (about) samples 380-480. The other detected interference (in the following sample ranges: 210-220, 230-240 and 580-600) is probably due to misjudgments of the interference detector. Outside of the interference there is a narrowband signal with a combination of sine waves (each with a relatively constant frequency), one for each target.

There are known systems that can identify time-domain samples in radar signalling that are likely to have interference, for example as described in EP 3620810 A1. As will be described below, the interference raises the noise floor after the subsequent Doppler processing.

Figure 3B:
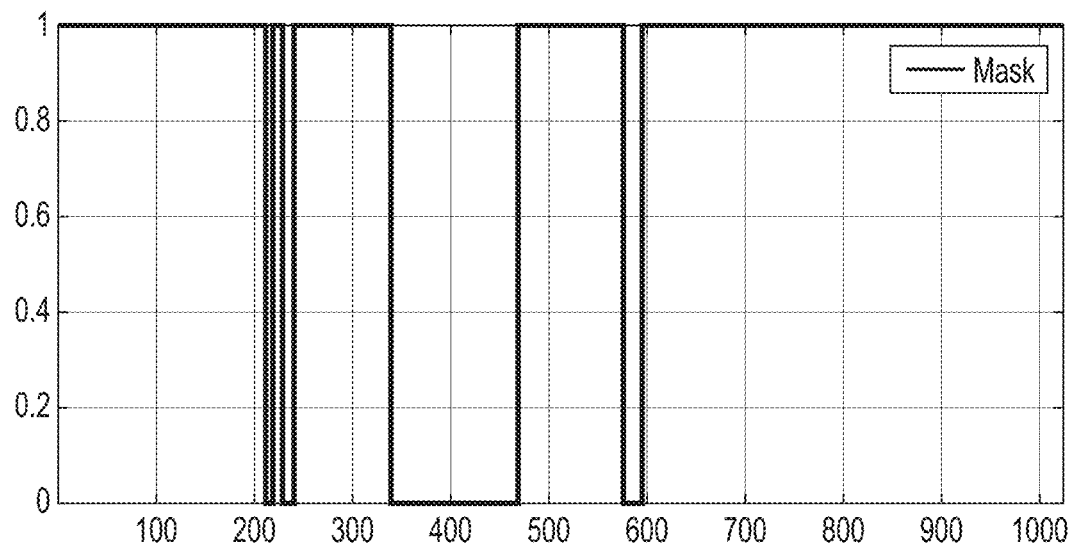
FIG. 3B shows an example of an interference mask for the interfered beat signal of FIG. 3A.

FIG. 3B shows an example of an interference mask (which will subsequently be referred to simply as a mask) for the interfered beat signal of FIG. 3A. The mask of FIG. 3B show the results of an interference detection technique.

For each chirp, the mask specifies which samples are likely to be interfered and which are non-interfered. In this example the mask is a binary mask, which has a value of 0 to specify samples that are interfered and a value of 1 to specify samples that are non-interfered.

Figure 3C:
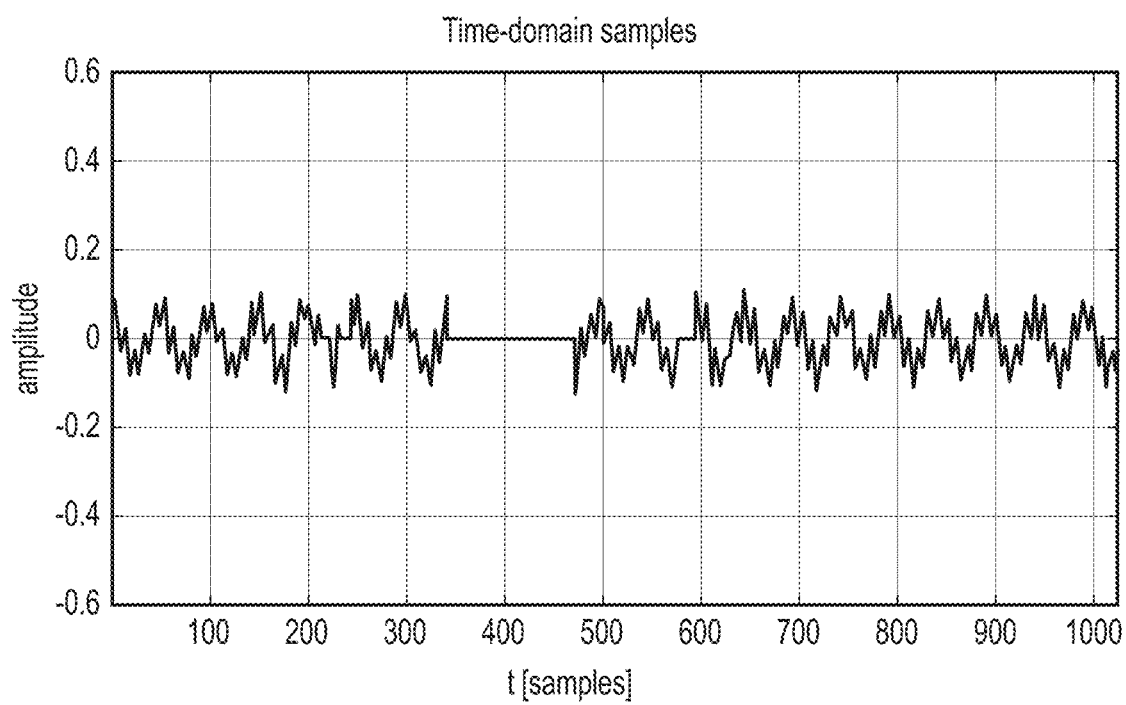
FIG. 3C shows the result of applying the mask of FIG. 3B to the radar signalling of FIG. 3A.

FIG. 3C shows the result of applying the mask of FIG. 3B to the radar signalling of FIG. 3A. The signalling of FIG. 3C can be referred to as interference-reduced-radar-signalling. Simply zeroing the detected interfered samples (also referred to as nulling), as shown in FIG. 3C, can be a very cost-effective way of mitigating the interference energy. If all interfered samples (even when the interference power is comparable to the maximum beat signal power) have been correctly identified, the interference energy can be completely removed.

However, this comes at a cost because the gaps in the signalling can result in amplitude reduction and/or phase distortion after subsequent frequency analysis (such as the application of a range FFT). This, in turn, can result in distance and velocity artefacts.

Distance Artefacts

It is known to represent radar signalling as a matrix of data having a first dimension and a second dimension, wherein the first dimension represents a fast-time axis and the second dimension represents a slow-time axis. The matrix can be populated with sample values sequentially such that each index on the slow-time axis represents a chirp index (in the figures that follow, the slow-time axis is the vertical axis), and each index on the fast-time axis represents a time sample within a chirp (in the figures that follow, the fast-time axis is the horizontal axis).

In principle, the zeroing that is described above with reference to FIGS. 3B and 3C means multiplying the fast-time samples with a binary mask, which can mathematically be represented as $$m[t] = 1 - \sum_{n=0}^{N} \prod\left(\frac{t - \tau_n}{T_n}\right) \quad (2)$$

where N is the number of rectangular windows that are present in the mask, $\tau_n$ indicates the center of the rectangular window, and $T_n$ indicates its time duration. Its frequency response is mathematically equivalent to $$M(f) = \delta(f) - \sum_{n=0}^{N} T_n sinc(\pi f T_n) e^{-j2\pi f \tau_n} \quad (3)$$

This means that the impulse response of every target reflection doesn't result in a Delta Dirac in the distance spectrum, but in a Delta Dirac with a sinc-function on top of it with a positive phase evolution of the sinc prior to the individual target beat frequency, and a negative phase evolution of the sinc after the individual target beat frequency.

Figure 4A:
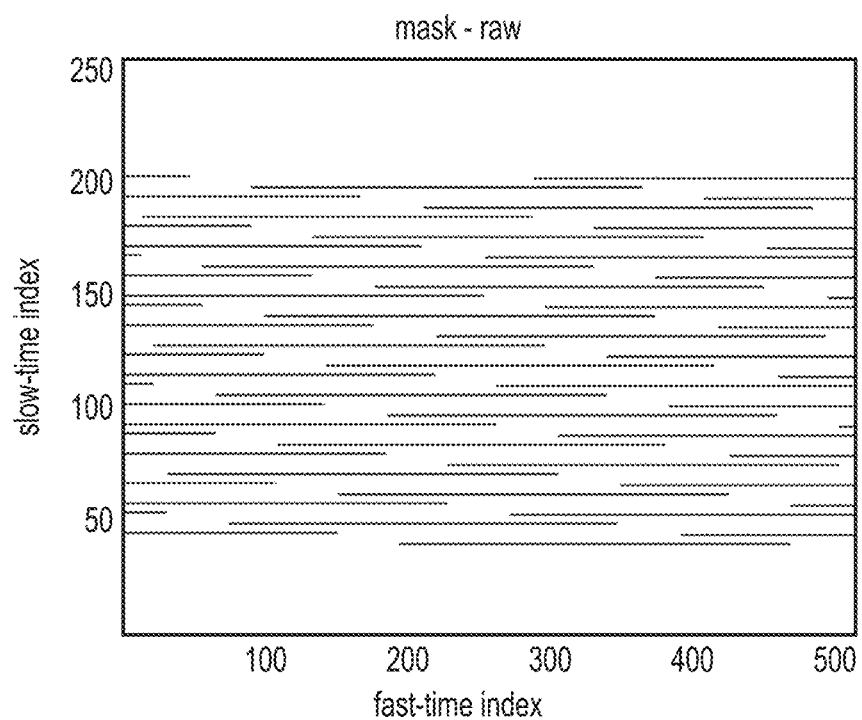
FIGS. 4A, 4B and 4C will be used to describe the results obtained for application of a binary mask.
Figure 4B:
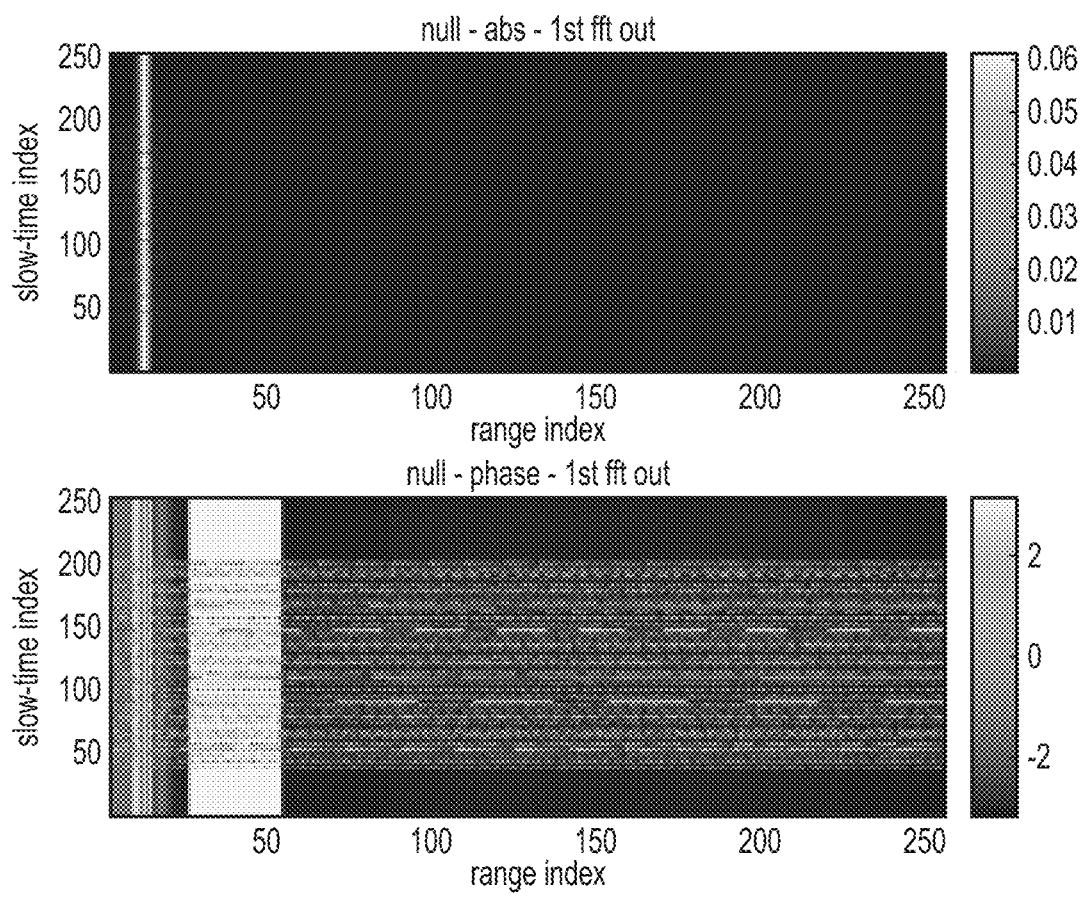
Figure 4C:
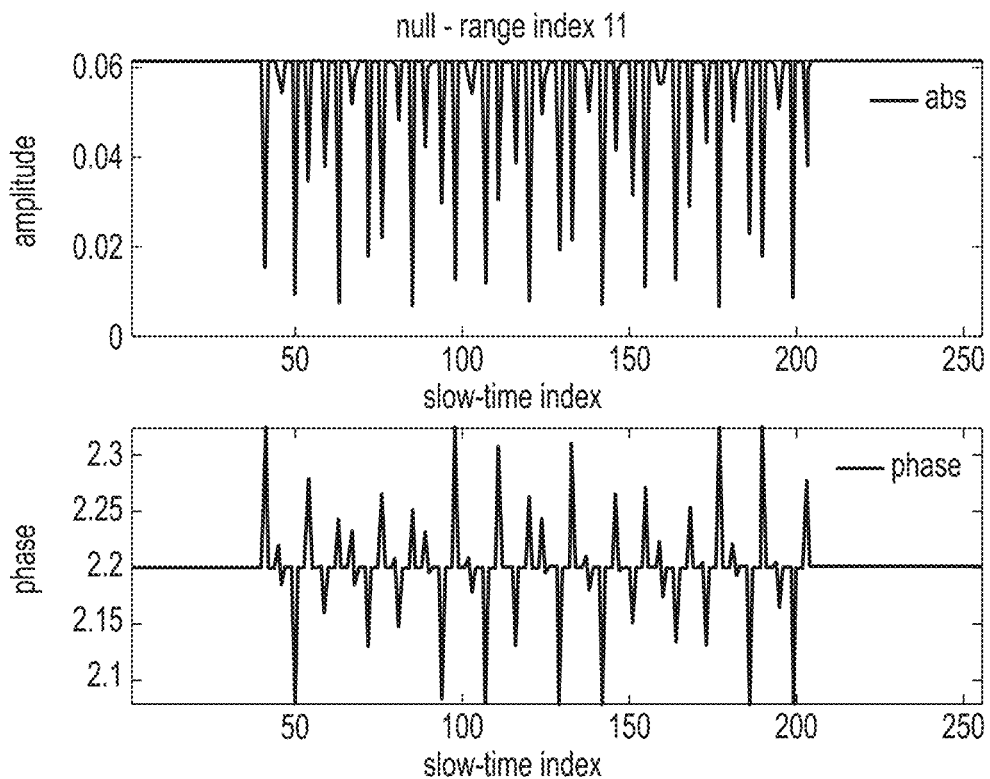
Figure 5C:
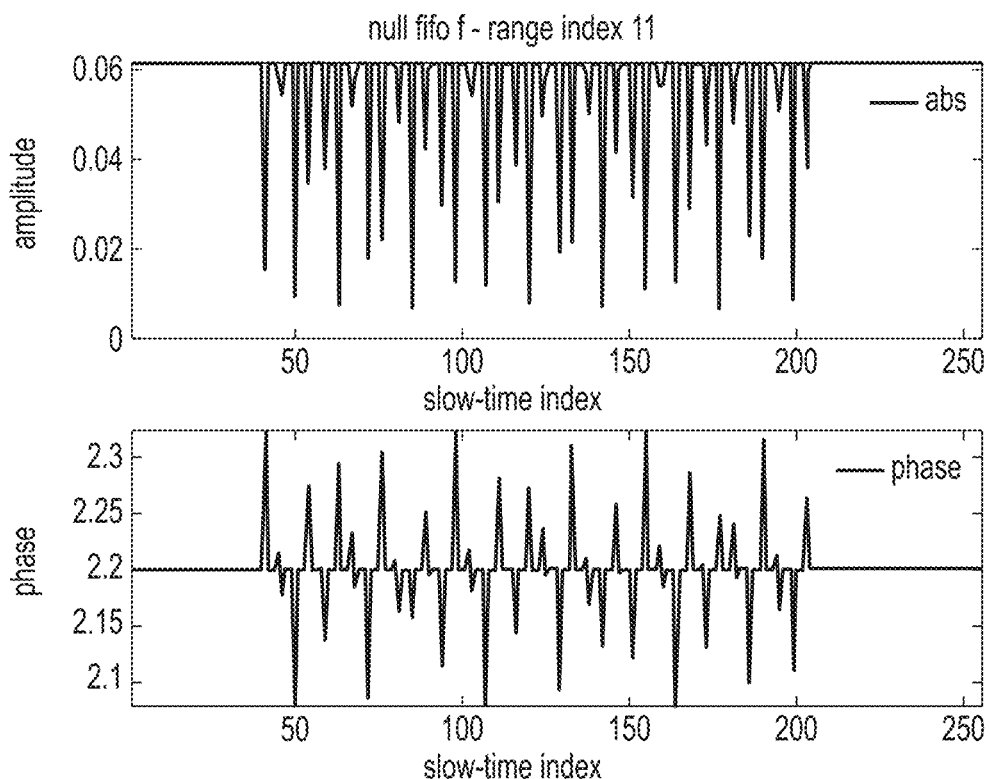
FIG. 5A, 5B and 5C will be used to describe the results obtained for application of a Fading-in Fading-out mask.
Figure 5A:
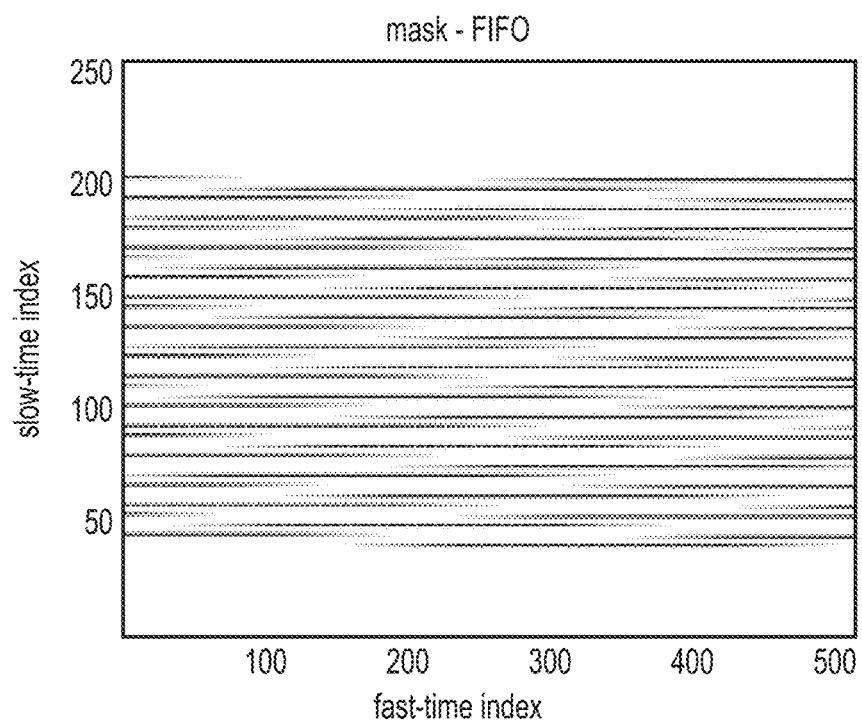
Figure 5B:
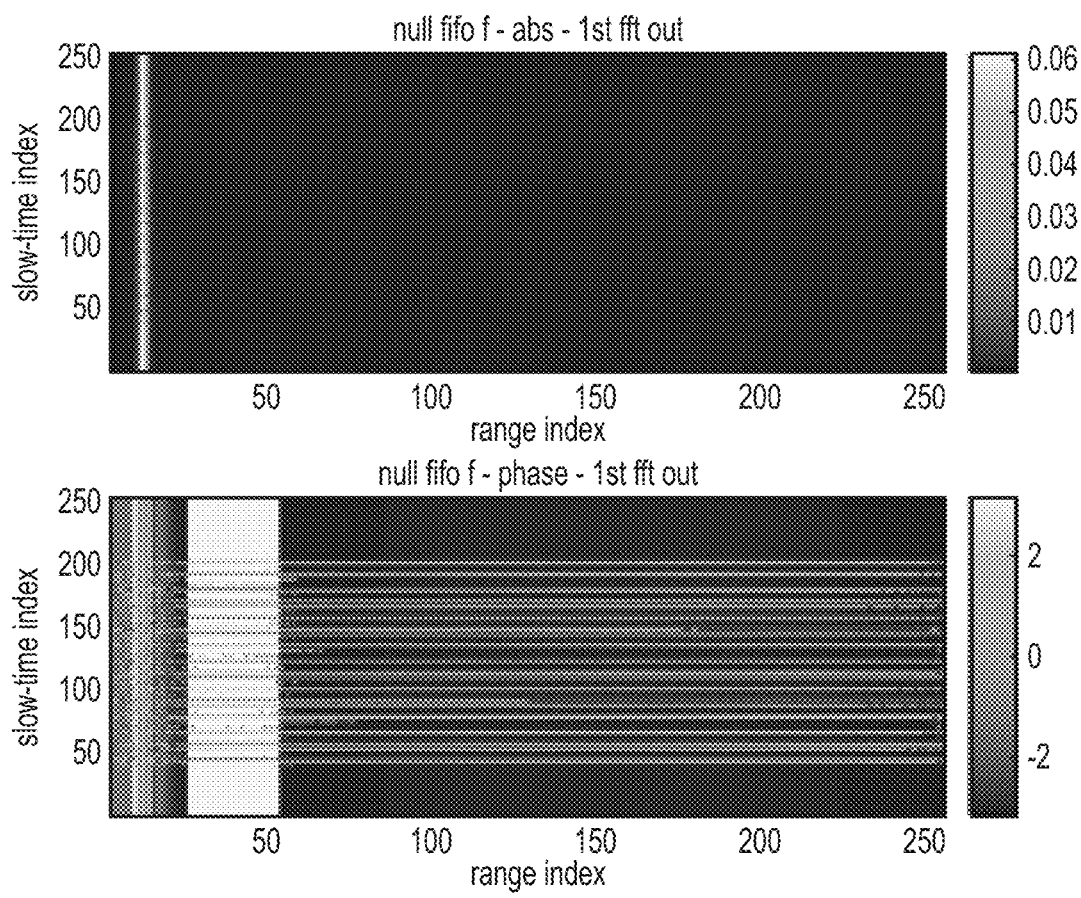

FIGS. 4A, 4B and 4C will be used to describe the results obtained for application of a binary mask. FIGS. 5A, 5B and 5C will be used to describe the results obtained for application of a FIFO (Fading-in Fading-out) mask.

FIG. 4A illustrates an example of a binary mask. The mask represents samples in the radar signalling that are detected as having interference. The mask comprises a matrix of data having a first dimension and a second dimension. The first dimension (the horizontal axis in FIG. 4A) represents a fast-time axis and the second dimension (the vertical axis in FIG. 4A) represents a slow-time axis. As indicated above, the slow-time axis can be considered as representing a chirp index. Each zero in the mask corresponds to a sample in the radar signalling that includes interference. The radar signalling also comprises a matrix of data having the same dimensions as the mask.

The mask of FIG. 4A has been generated for simulated radar signalling that includes a single target in range gate 11.

FIG. 4B shows a plot of amplitude (upper plot of FIG. 4B) and phase (lower plot of FIG. 4B) following the application of a fast Fourier transform (FFT) to interference-reduced-radar-signalling (which itself is the result of applying the binary mask of FIG. 4A to the radar signalling) across the fast-time axis. Application of this FFT can be considered as applying a range FFT. It can be seen that the range FFT output has phase distortions in the slow-time indices that contain interference (approx. indices 55-210 in this example). Although not particularly visible in the upper plot of FIG. 4B, there are also amplitude distortions in the same slow-time indices (approx. indices 55-210). The amplitude distortions in the upper plot of FIG. 4B behave as the sinc-pattern from Eq. (3), while in the lower figure the phase term is clearly visible from Eq. (3).

FIG. 5A illustrates an example of a determined mask after fading-in fading-out (FIFO) processing along the fast-time axis. Therefore, the mask of FIG. 5A is a non-binary mask.

FIG. 5B shows a plot of amplitude (upper plot of FIG. 5B) and phase (lower plot of FIG. 5B) following the application of a fast Fourier transform (FFT) to interference-reduced-radar-signalling (which itself is the result of applying the non-binary mask to the radar signalling) across the fast-time axis. Use of a FIFO mask diminishes the sidelobes of the sinc, and hence also the phase artefacts caused by it for these fast-time samples, as evidenced by a comparison of the lower plot of FIG. 5B with the lower plot of FIG. 4B. The range-FFT output of the FIFO'ed mask, as shown in FIG. 5B, unavoidably only contains the main lobe of the sinc with the induced phase distortions on top of it. Although it is not particularly visible in the upper plot of FIG. 5B, the amplitude distortions have also been reduced when compared with the corresponding plot of FIG. 4B.

Therefore, the above-described FIFO method reduces the artefacts mainly in the distance dimension.

FIG. 4C shows for each slow-time index the amplitude (upper plot of FIG. 4C) and phase (lower plot of FIG. 4C) of the distance/range FFT output of range index (gate) 11. The distance/range FFT output will be used as an input for a velocity FFT that is applied across the slow-time axis (as will be described below).

In this example, it is assumed that the target is stationary, in which case the amplitude and phase should be constant. However FIG. 4C shows that, due to the "interference mitigated" technique that has been applied, artefacts arise in both the amplitude and the phase. This will have an impact on the output of the velocity FFT, i.e. ghost targets will appear in the velocity domain. That is, FIG. 4C shows the undesired effects of the discontinuities in the range FFT output (vertical cross-sections of amplitude and phase of FIG. 4B, respectively), caused by the removal of the wanted signal and also the unwanted signal (interference) by the binary mask. Similarly, FIG. 5C shows the undesired effects of the discontinuities in the range FFT output caused by the removal of interference by the non-binary (FIFO) mask. For both FIGS. 4C and 5C, this fading in amplitude and phase will mainly induce artefacts in the velocity dimension, which are only observed after the velocity FFT. As will be discussed below, the distortions in FIGS. 4C and 5C create significant distortions in the velocity dimension of the target's range gate.

Figure 6A:
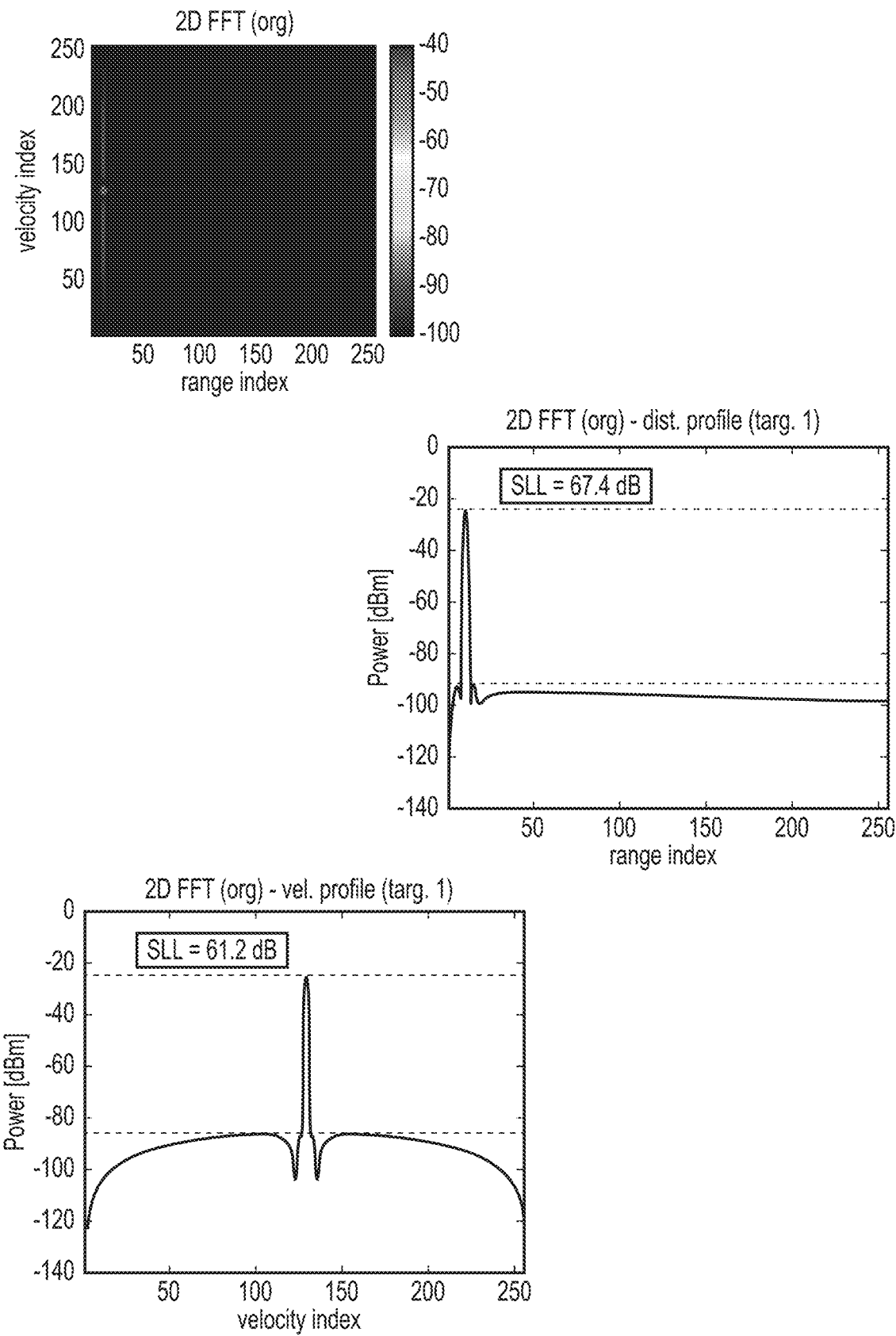
FIG. 6A shows the three plots for radar signalling with no interference.
Figure 6B:
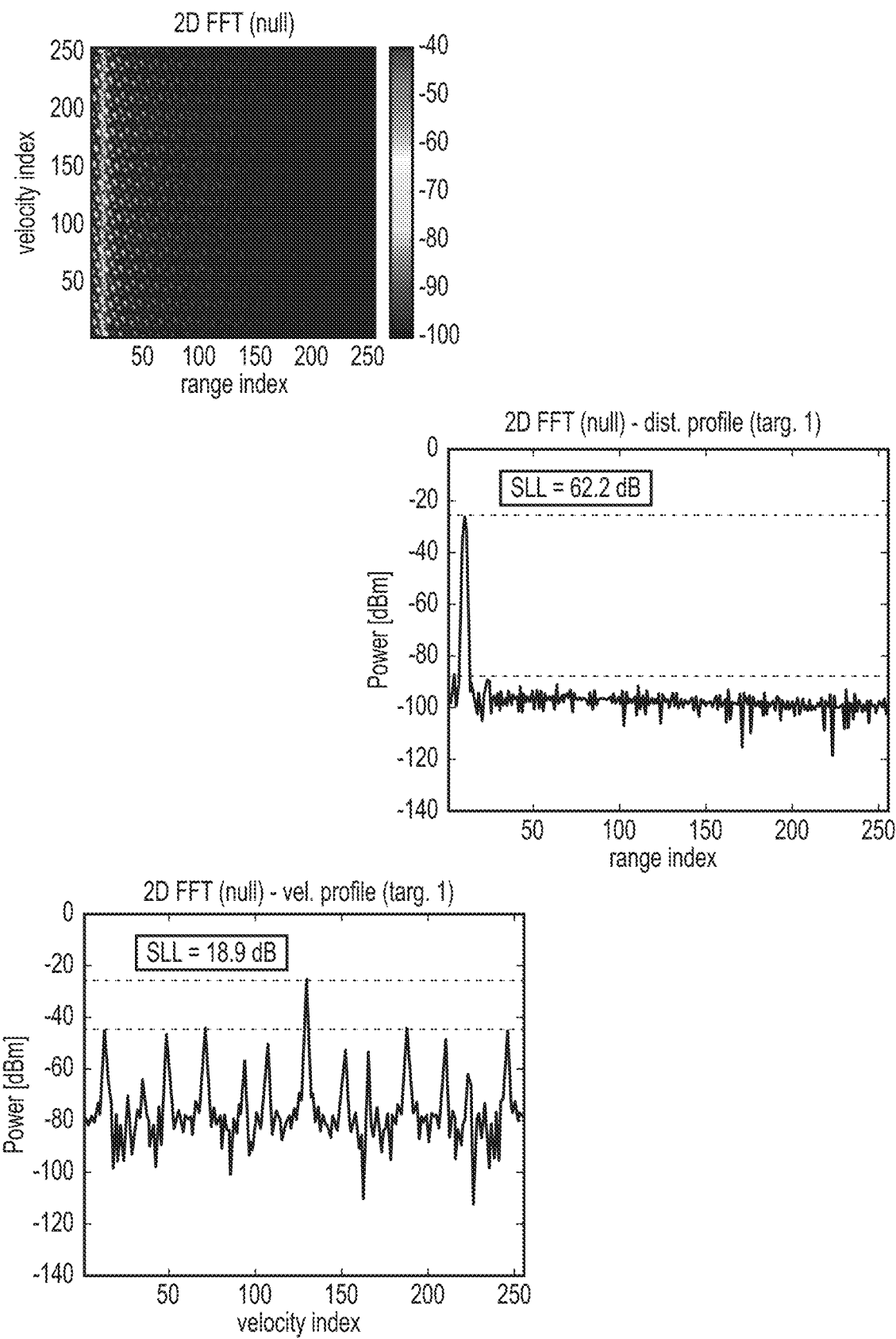
FIG. 6B shows the three plots for radar signalling (after 2D processing) with interference that has been mitigated by time domain nulling using a binary mask.
Figure 6C:
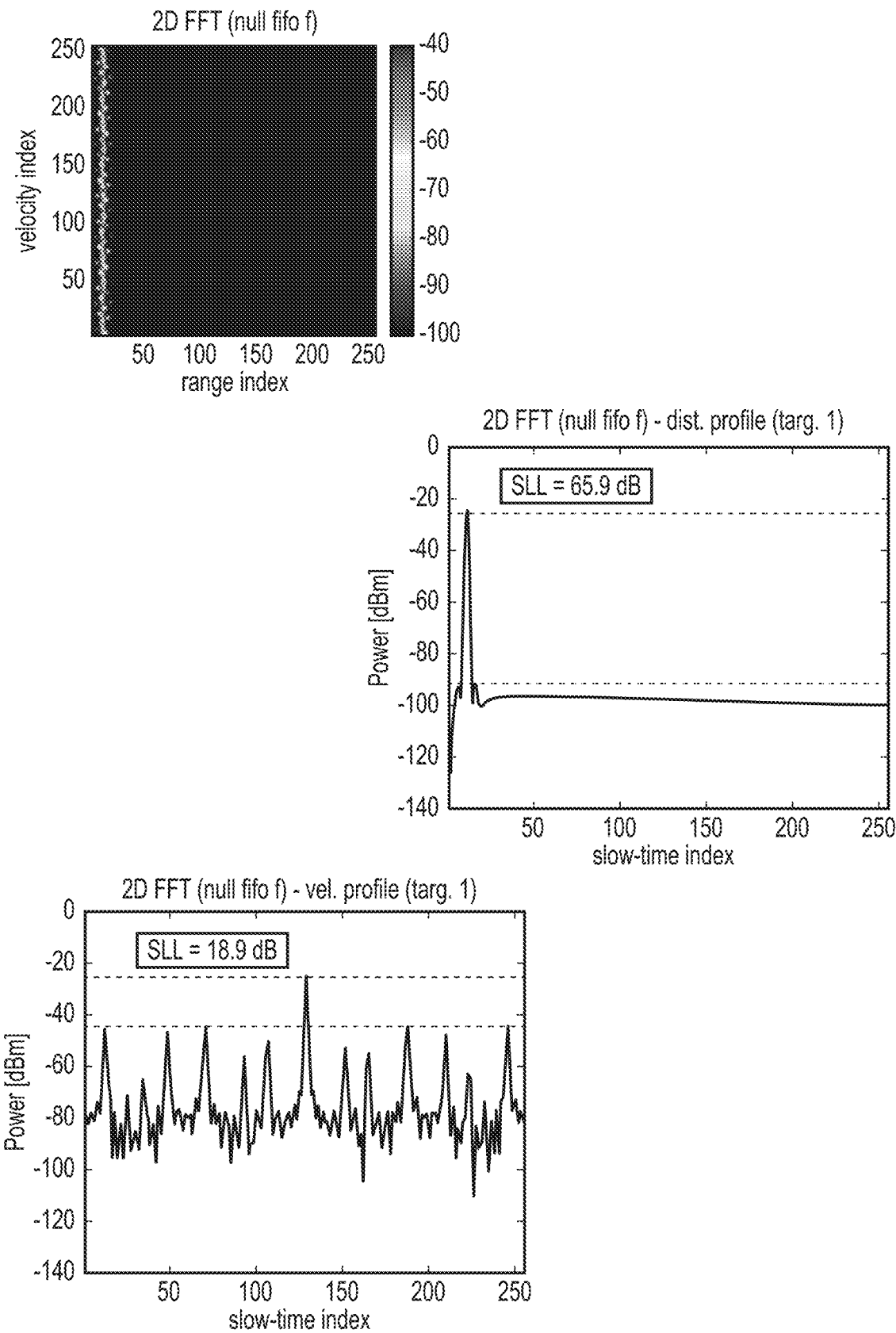
FIG. 6C shows the three plots for radar signalling with interference that has been mitigated by time domain nulling using a FIFO mask along the fast-time dimension.

Each of FIGS. 6A to 6C disclose a range-Doppler output with 2D map (upper plot), a target's distance profile (middle plot) and the target's velocity profile (lower plot). The middle plot is a horizontal cross-section from the upper plot, and therefore provides the distance profile for one velocity value. Similarly, the lower plot is a vertical cross-section of the upper plot, and therefore provides the velocity profile for one range value.

FIG. 6A shows the three plots for radar signalling with no interference. FIG. 6B shows the three plots for radar signalling with interference that has been mitigated by time domain nulling using a binary mask. FIG. 6C shows the three plots for radar signalling with interference that has been mitigated by time domain nulling using a FIFO mask.

In the upper plot of FIG. 6A the real target can be seen. Whereas in the upper plots of FIGS. 6B and 6C various ghost targets are also visible. Furthermore, in FIGS. 6B and 6C it can be seen that velocity sidelobes appear in the target's range gate and its adjacent gates. In this specific case, the velocity sidelobes are 18.9 dB with respect to the main lobe. This will especially be problematic for close by targets, where the sidelobes will appear far above the thermal noise floor, and likely be incorrectly detected as a target (i.e., a false/ghost target).

Figure 7:
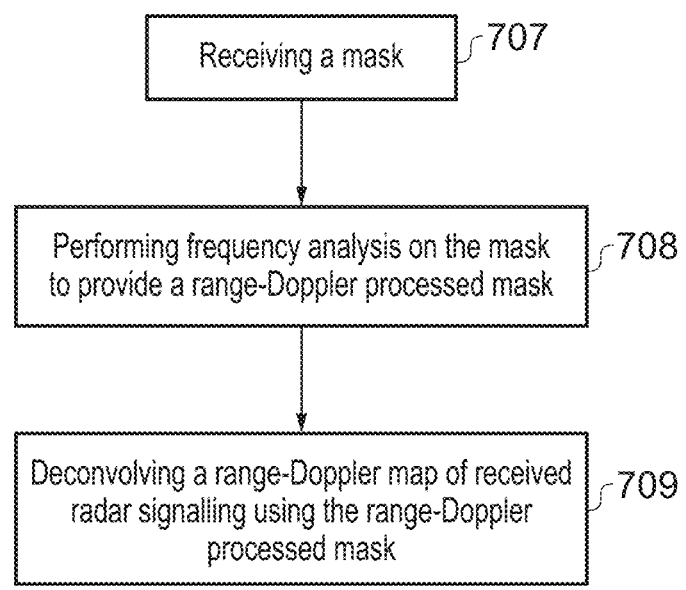
FIG. 7 illustrates an example embodiment of a method of processing radar signalling.

FIG. 7 illustrates an example embodiment of a method of processing radar signalling according to the present disclosure.

At step 707, the method involves receiving a mask that represents samples in the radar signalling that are identified as including interference. The mask may be a binary or a non-binary mask. In the same way as described above, the mask comprises a matrix of data having a first dimension and a second dimension. The first dimension represents a fast-time axis, and the second dimension represents a slow-time axis. The detection of the interference, and therefore the population of data in the mask, can be performed according to any method that is known in the art.

Figure 9:
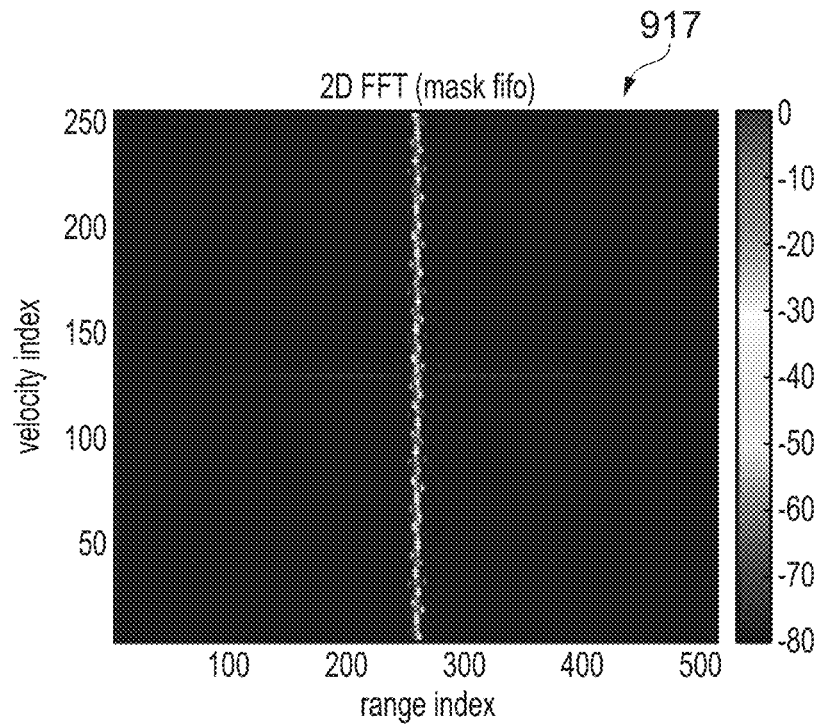
FIG. 9 shows an alternative graphical representation of the range-Doppler processed mask calculated over the whole Range-Doppler domain.
Figure 10:
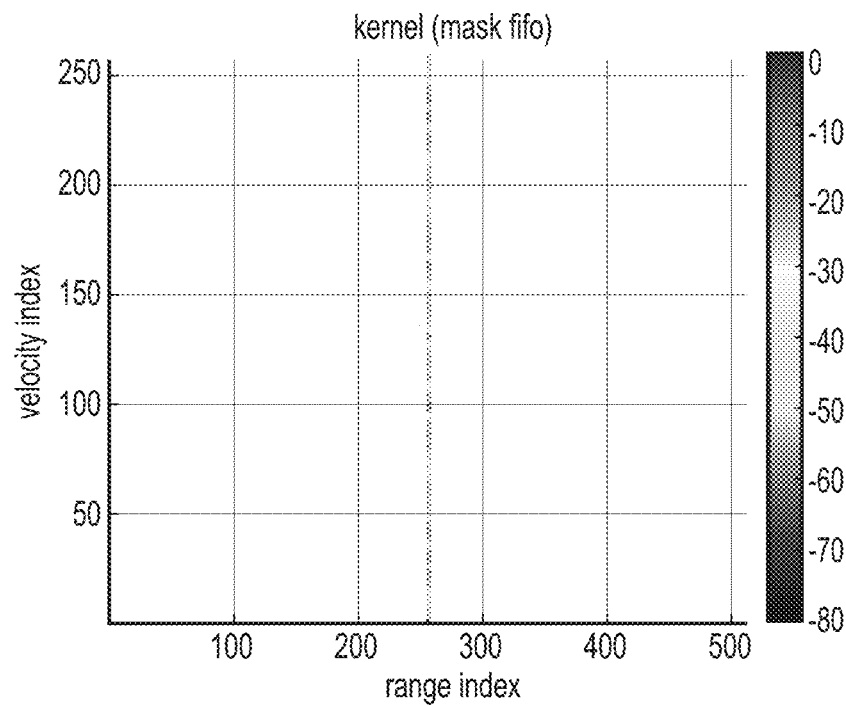
FIG. 10 shows an example of a kernel K (range-Doppler processed mask) for $N_D=1$.

At step 708, the method performs frequency analysis on the mask across each of the first and second dimensions of the mask in order to provide a range-Doppler processed mask. This frequency analysis can correspond to frequency analysis that is performed on the received radar signalling in order to determine a range-Doppler map. For instance, the frequency analysis can include applying a Fourier transform across the fast-time axis and applying a Fourier transform across the slow-time axis, the results of which are shown in FIGS. 9 and 10. Alternatively, the frequency analysis can include a correlation with sine waves. Either way, the resultant range-Doppler processed mask can include artefacts that correspond to artefacts that are generated by processing the radar signalling following application of the mask. The range-Doppler processed mask, or a subset of the range-Doppler processed mask, can be referred to as a kernel.

At step 709, the method deconvolves a range-Doppler map of the received radar signalling using the range-Doppler processed mask in order to provide a deconvolved-range-Doppler map. Advantageously, as will be discussed in detail below, applying this deconvolution can reduce the significance of the velocity artefacts, for example by reducing the amplitude of imperfections, and therefore result in fewer false detections of ghost/non-existent targets.

Figure 8:
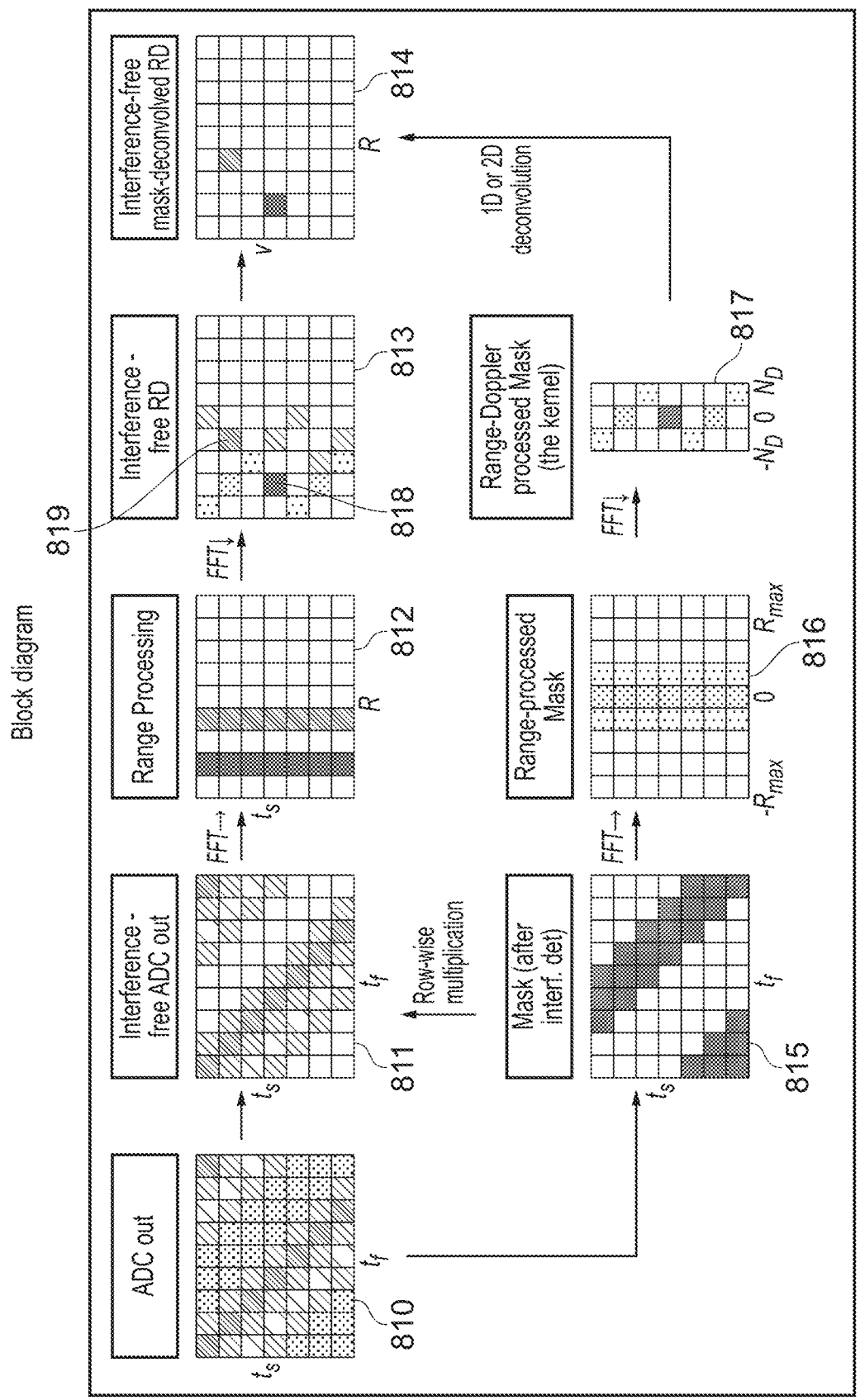
FIG. 8 illustrates schematically a process flow of an example embodiment of the present disclosure, which includes the method of FIG. 7.

FIG. 8 illustrates schematically a process flow of an example embodiment of the present disclosure, which includes the method of FIG. 7.

FIG. 8 shows a matrix representation of received radar signalling 810. The radar signalling 810 is shown as a two-dimensional matrix of data having a first dimension (the horizontal fast-time dimension/axis) and a second dimension (the vertical slow-time axis). The radar signalling 810 includes interference, for example from a nearby radar system that is operating in a different but overlapping frequency range.

FIG. 8 shows that a mask 815 is determined for the received radar signalling 810. The two-dimensional mask in this example is a binary mask that has zeros (the cells that are shown shaded) at positions in the matrix at which interference has been detected. Optionally, a Fading-in Fading-out mask, or any other type of mask, can be used to reduce the distance-dependent artifacts. If there is no interference, the mask will be a rectangular matrix of all ones and no mitigation will be required.

The mask 815 is then applied to the received radar signalling 810 in order to provide interference-reduced-radar-signalling 811, which again is a matrix of data having the same dimensions as the received radar signalling 810.

Frequency analysis is then performed on the interference-reduced-radar-signalling 811, across each of the respective first and second dimensions of the interference-reduced-radar-signalling, in order to provide a range-Doppler map 813 of the received radar signalling. More particularly, in this example a Fourier transform is applied across the fast-time axis of the interference-reduced-radar-signalling 811 to provide range-processed-signalling 812. This can be referred to as applying a range FFT. Then, a Fourier transform is applied across the slow-time axis of the range-processed-signalling 812 to provide the range-Doppler map 813. This can be referred to as applying a velocity FFT. In other examples these Fourier transforms can be applied in the reverse order.

The range-processed-signalling 812 is a matrix of data that has a first dimension and a second dimension. The second, vertical, dimension is still the slow-time axis. The first, horizontal, axis is a distance axis (R). In FIG. 8, the identification of two targets is visible as represented by the shading (data) in the second and fourth columns.

The range-Doppler map 813 is a matrix of data that has a first dimension and a second dimension. The first, horizontal, axis is a distance axis (R). The second, vertical, dimension is a velocity axis (v). In FIG. 8, various cells of the matrix are shaded (that is, they include significant data)—two of which correctly represent the real targets (labelled as 818 and 819); the remaining shaded cells represent artefacts that could be incorrectly identified as (ghost) targets.

Turning to the lower branch of processing that is shown in FIG. 8, equivalent frequency analysis is also performed on the mask 815 across each of the first and second dimensions of the mask in order to provide a range-Doppler processed mask 817. The frequency analysis that is performed on the mask corresponds to the frequency analysis that is performed on the interference-reduced-radar-signalling 811.

In some examples, subsequent processing of the mask 815 is only performed if at least one row/cell of the mask 815 contains a value that indicates that interference is present. Otherwise, the lower branch of processing, as it is shown in FIG. 8, may be aborted because it will not further improve the quality of the range-Doppler map 813. In this way, the mask can be processed to determine if there are at least a predetermined number of samples that include interference (which can be one or more samples, and can include determining if samples have a level of interference that is above a threshold). Then, the process flow may only continue perform frequency analysis on the mask and deconvolve the range-Doppler map if there are at least a predetermined number of samples that include interference.

Then, for every row (which corresponds to every chirp) in the 2D matrix, m[k,n], of the mask 815 a FFT is performed to retrieve the frequency response of the mask along fast-time:

$$M[k, n] = \frac{1}{N_f} \sum_{p=0}^{N_f-1} m[k, p] e^{-\frac{2\pi n p}{N_f}}$$

This corresponds to applying a Fourier transform across the fast-time axis of the mask 815 to provide a range-processed-mask 816.

Then, a Fourier transform is applied across the slow-time axis of the range-processed-mask 816 to provide the range-Doppler processed mask 817. Optionally, the Fourier transform may be applied across only a subset of the distance indices (columns) of the range-processed-mask 816 to provide the range-Doppler processed mask 817. This is discussed in more detail below. In the example, of FIG. 8, the Fourier transform is applied across 3 columns of the range-processed-mask 816 to provide the range-Doppler processed mask 817.

FIG. 9 shows a graphical representation of the range-Doppler processed mask 917 calculated over the entire slow-time axis and the entire fast-time axis. In this way, it is calculated over all fast-time and slow-time samples. Range index is shown on the horizontal axis and velocity index is shown on the vertical axis. FIG. 9 reveals where, and to what extent, the application of the mask will induce sidelobes that appear in range and Doppler with respect to the main lobe, respectively. Beneficially the frequency analysis that is performed on the beat signal to calculate the range-Doppler map 813 is repeated on the mask 815. One can observe the similarities between the range-Doppler processed mask 917 of FIG. 9 and the range-Doppler output of FIG. 6C. This confirms that the amplitude and phase fading can equivalently be modelled by taking a two-dimensional FFT over the interference mask 815.

Then, a design parameter $N_D$ indicating the range bin memory of the adjacent range bins with respect to the 0-delay range bin can be used. It determines the size of the kernel K (of size $N_s \times (2N_D+1)$) that will be used to deconvolve the range-Doppler output with;

| | | |
|---|---|---|
| $N_D = 0$: | $N_s \times 1$ | (0 range gate only) |
| $N_D = 1$: | $N_s \times 3$ | (−1, 0, 1 range gate) |
| $N_D = 2$: | $N_s \times 5$ | (−2, −1, 0, 1, 2 range gate) |
| etc. | | |

The motivation for using the design parameter $N_D$ is visible in FIG. 10, where it can be seen that the most significant artefacts are confined to a relatively small range of values in the range direction (i.e. only a few columns), yet are smeared out over the whole velocity axis (over all of the rows).

Consequently, only the complex-valued FFT output corresponding to the 0-delay range gate and $N_D$ adjacent range gates prior to and $N_D$ adjacent range gates after 0-delay M[k, $n_{sel}$] with $n_{sel}$ being [$-N_D$, $-N_D+1$, ..., 0, ..., $N_D+1$, $N_D$] needs to be stored, resulting in a $N_s \times (2N_D+1)$ matrix. Performing an FFT over the range-processed-mask 816, will still result in a $N_s \times (2N_D+1)$ matrix, which is the range-Doppler processed mask 917 (kernel K):

$$K[k, n_{sel}] = \frac{1}{N_s} \sum_{q=0}^{N_s-1} M[q, n_{sel}] e^{-\frac{2\pi k q}{N_s}}$$

In this way, the size of the subset across with the velocity FFT is applied can be set according to a design parameter, and can be one, three, five or any desired number of indices of the slow-time axis as non-limiting examples.

Furthermore, since only $N_D$ columns are calculated, it can be possible to use a discrete Fourier transform (DFT) instead of a FFT; i.e. directly calculate the $2N_D+1$ entries (in the horizontal direction).

FIG. 10 shows an example of a kernel K (range-Doppler processed mask 917) for $N_D=1$, hence the size of K is $N_s \times 3$. The kernel indicates where ghost targets appear relative to the main peak in the Doppler spectrum, and also the ghost targets in the $N_D$ surrounding range gates. The subsequent deconvolution operation, disclosed herein, can reduce the effects of these artefacts, which have been created by applying the mask as discussed above.

Returning to FIG. 8, finally the range-Doppler map 813 of the received radar signalling is deconvolved using the range-Doppler processed mask 817 in order to provide a deconvolved-range-Doppler map 814. As shown in FIG. 8, this has beneficially removed the artefacts from the range-Doppler map 813.

In this example the deconvolution is applied as follows. For $N_D=0$, all or only the selected velocity profiles (columns) of the range-Doppler map 813, Y, a 1D-deconvolution is applied column-wise with the retrieved kernel (range-Doppler processed mask 817) to get to the deconvolved-range-Doppler map 814, Y'. An embodiment of the proposed deconvolution technique is a point-wise spectral division (although any deconvolution technique—including 1D or 2D, spectral or otherwise—can be used):

$$Y'[k, n] = IFFT\left\{\frac{FFT\{Y[k, n]\}}{FFT\{K[k, 0]\}}\right\}$$

which can be executed for each k individually.

If $N_D>0$, a 2D deconvolution technique can be applied. From image processing, fast and efficient 2D deconvolution techniques are known in the art.

The technique that is illustrated in FIG. 8 exploits a 2D interference mask, defined as m[k,n]∈ {0,1} for $k^{th}$ slow-time sample and $n^{th}$ fast-time sample of $N_s \times N_f$ size, with $N_s$ and $N_f$ being the number of slow-time and fast-time samples, to generate a kernel that will be used to deconvolve a range-Doppler map 813. The output of the deconvolved column(s) shows that the sidelobe levels are significantly reduced for the range profiles where the technique has been applied.

Figure 11:
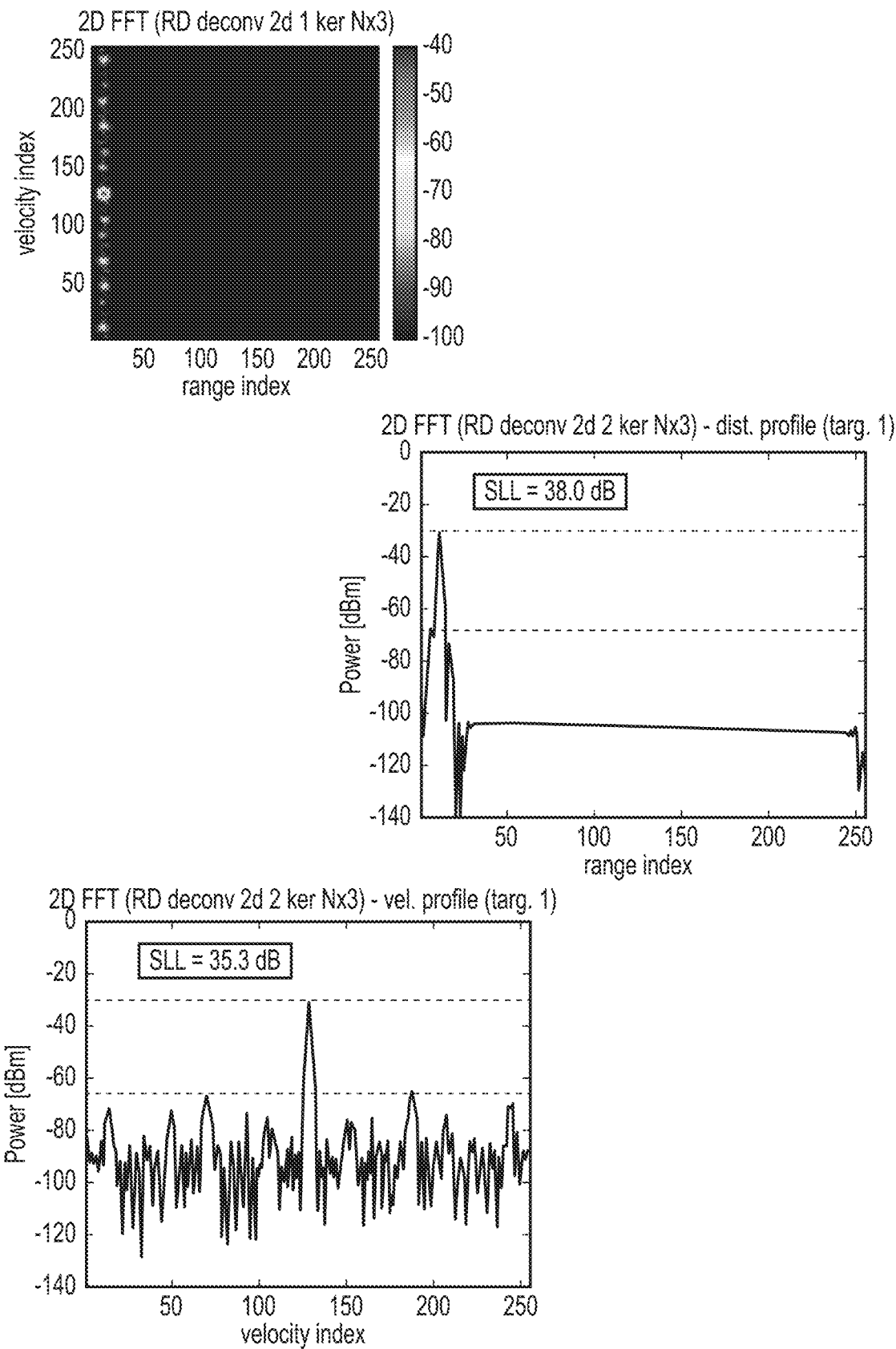
FIG. 11 shows the output of the processing of FIG. 8 (with size $N_s \times 3$), in the same format as the plots of FIG. 6.

FIG. 11 shows the output of the processing of FIG. 8 (with size $N_s \times 3$), in the same format as the plots of FIG. 6. That is, FIG. 11 shows a range-Doppler output with 2D map (upper plot), the target's distance profile for one velocity value (middle plot) and target's velocity profile for one range value (lower plot).

Figure 12:
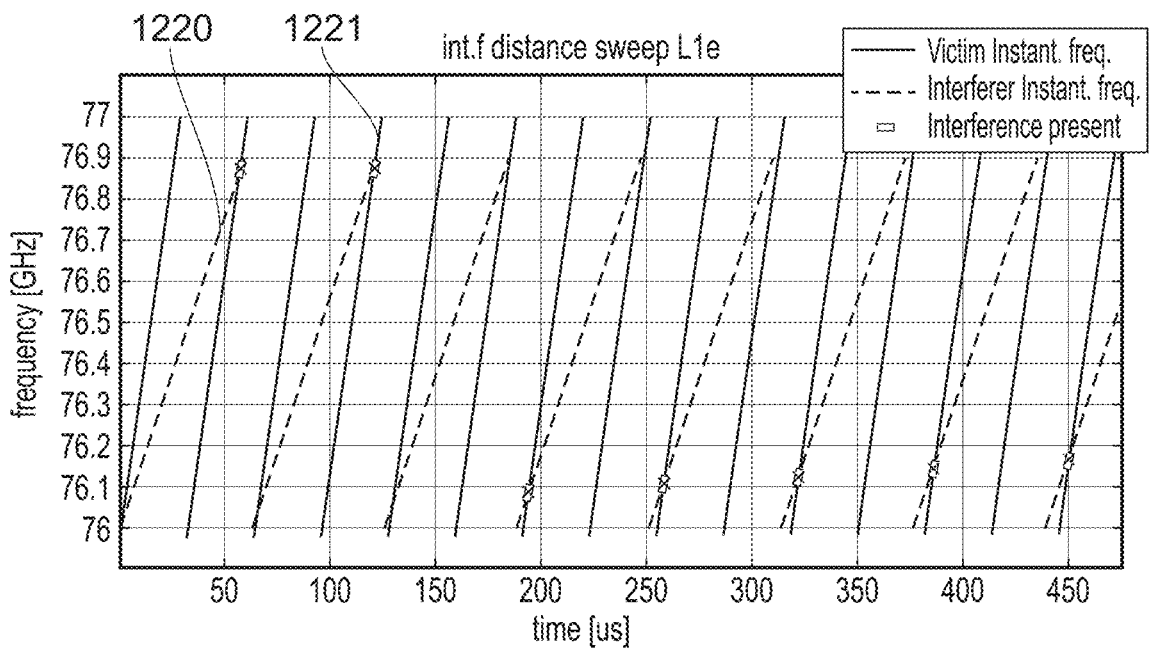
FIG. 12 shows results for chirp plans of a victim and an interferer.

FIG. 12 shows results for chirp plans of a victim and an interferer. The results were obtained from a reference chain, in a very realistic equivalent baseband simulation, including realistic antenna patterns, transceiver front-ends, etc. Interference occurs where the instantaneous frequency of the interferer 1220 overlaps with the instantaneous frequency of the victim 1221. Only some of the instances where the interference is present have been marked with an x in FIG. 12, to assist with this clarity of the illustration. In this example, the interferer was active in 80 of the victim's 256 chirps.

Figure 13A:
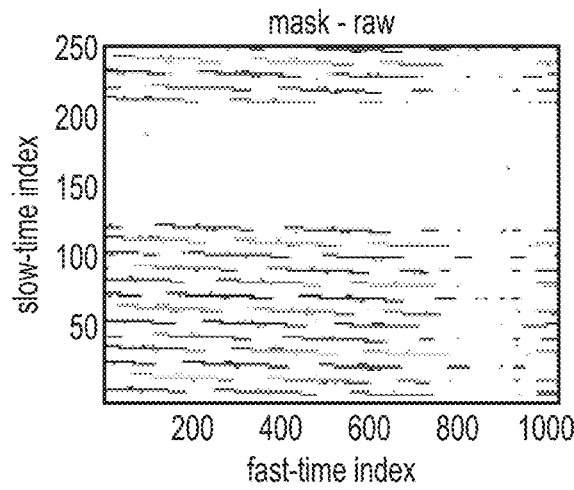
FIG. 13A shows an interference detection mask that has been determined for the signalling of FIG. 12.
Figure 13B:
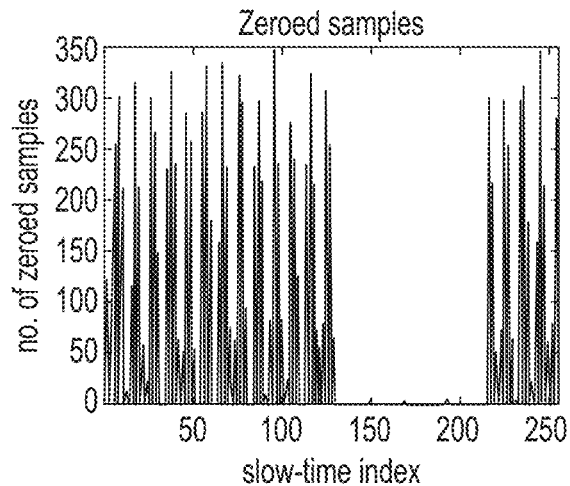
FIG. 13B shows the corresponding number of interfered samples for each chirp.

FIG. 13A shows a detection/interference mask that has been determined for the signalling of FIG. 12. FIG. 13B shows the corresponding number of interfered samples for each chirp.

Three targets were modelled as follows:

| | | | | |
|---|---|---|---|---|
| 5 m | 0 km/h | 0 az deg. | 90. el. deg. | 10 dBsm |
| 15 m | −36 km/h | 5.72 az deg. | 90. el. deg. | 10 dBsm |
| 25 m | 43.2 km/h | 0 az deg. | 90 el. deg. | 10 dBsm |

Figure 14A:
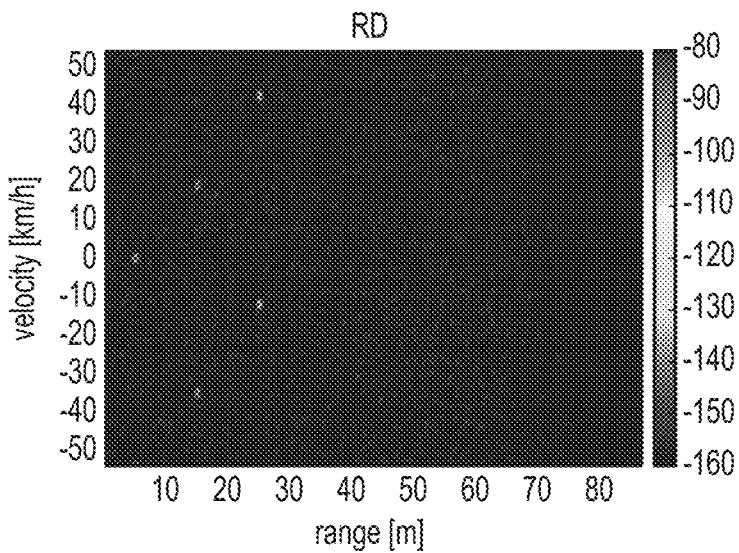
FIG. 14A shows the effects on a range-Doppler map that is output for a non-interfered output.
Figure 14A:
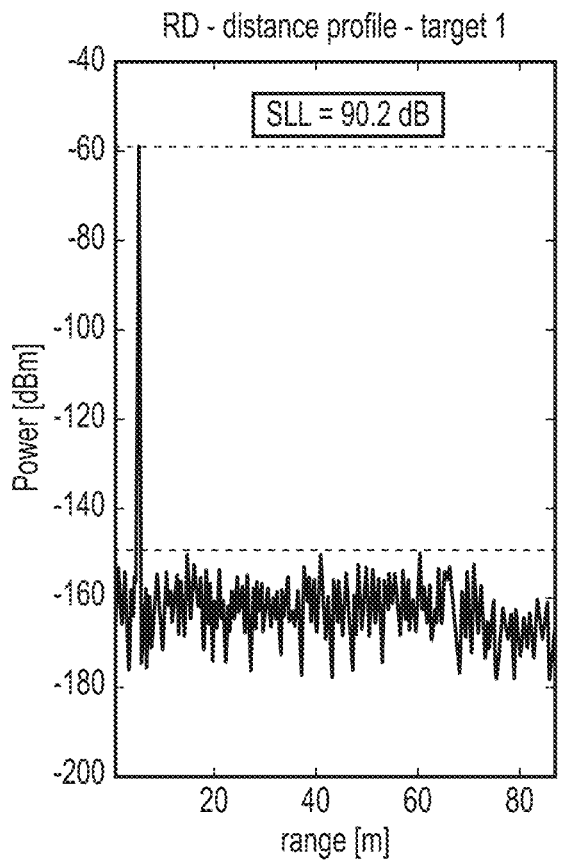
Figure 14A:
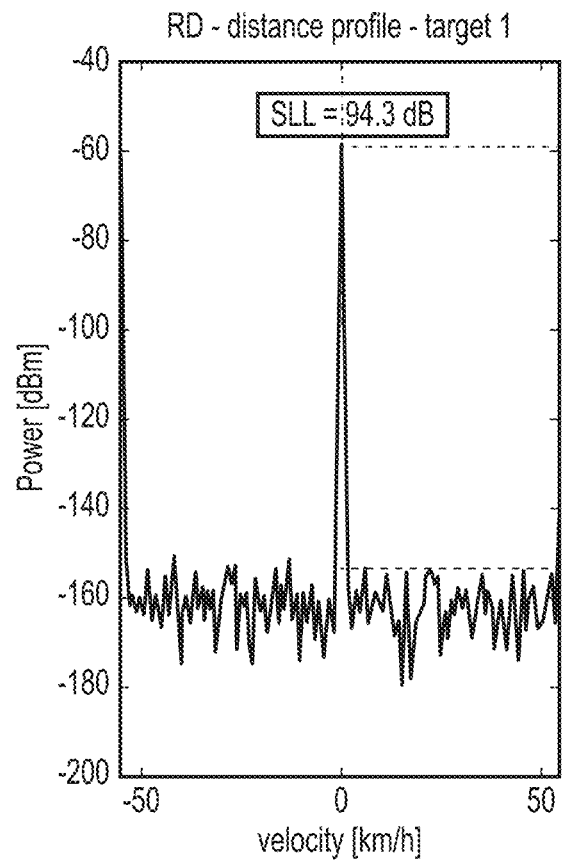
Figure 14B:
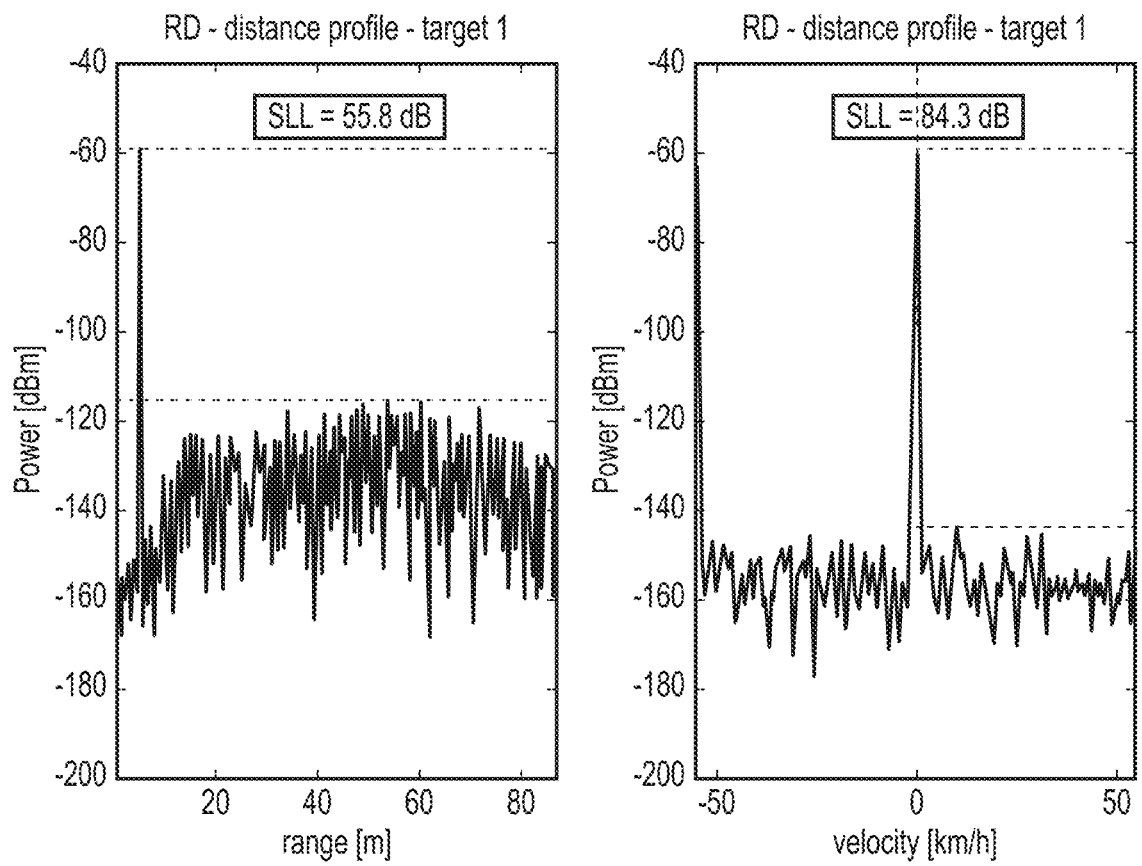
FIG. 14B shows the effects on a range-Doppler map that is output for an interfered output.
Figure 14C:
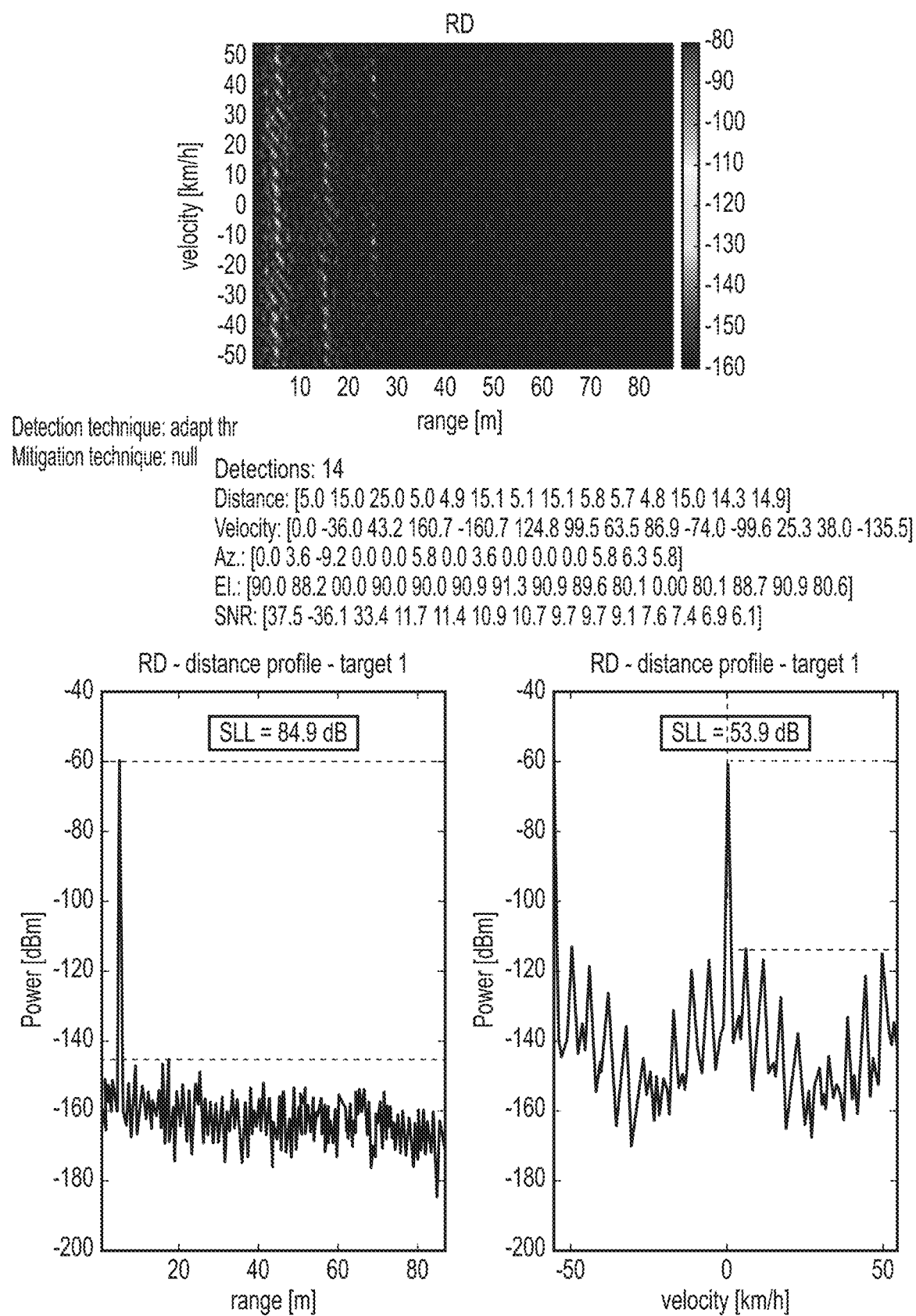
FIG. 14C shows the effects on a range-Doppler map for and an output that is mitigated with the use of a binary mask.

FIGS. 14A, 14B and 14C show the effects on the range-Doppler maps that are output for each of a non-interfered output, an interfered output and an output that is mitigated with the use of a binary mask, respectively. In FIG. 14C, the artefacts are clearly visible in the velocity gates of the targets.

Figure 14D:
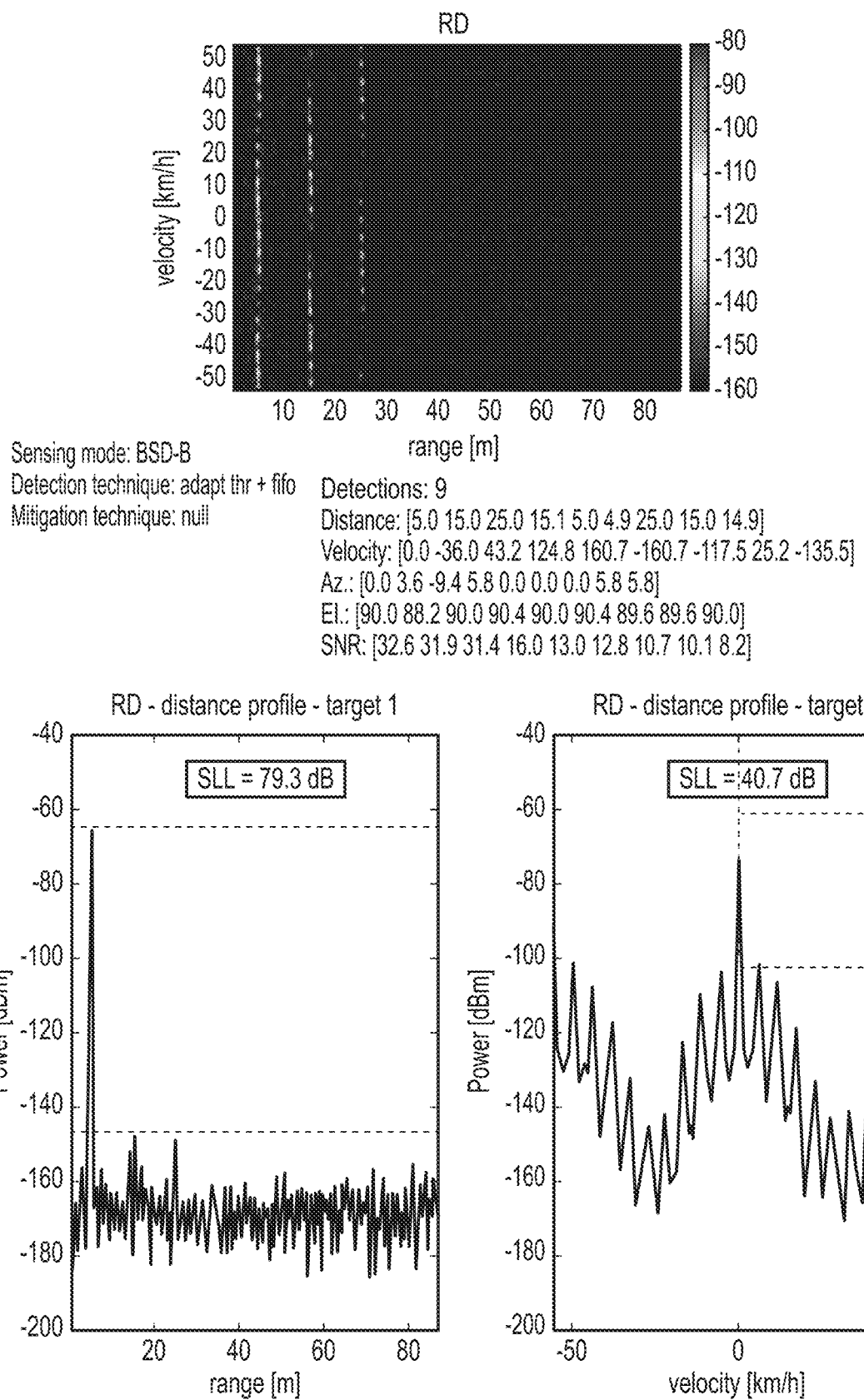
FIG. 14D show the effects on the range-Doppler maps when a FIFO technique is used.

FIG. 14D show the effects on the range-Doppler maps when a FIFO technique is used, which reduces the artefacts in the adjacent range gates of the targets.

Figure 14E:
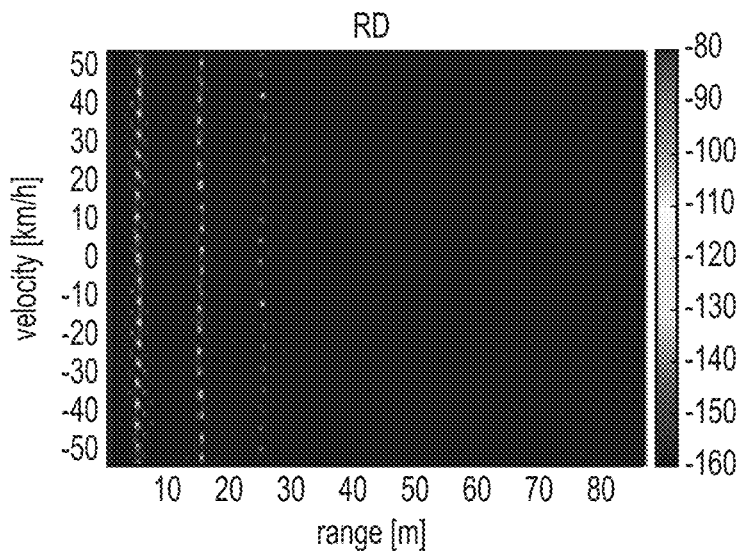
FIG. 14E shows the results when a range-Doppler processed mask is used to deconvolve the range-Doppler map according to an example embodiment of the present disclosure.
Figure 14E:
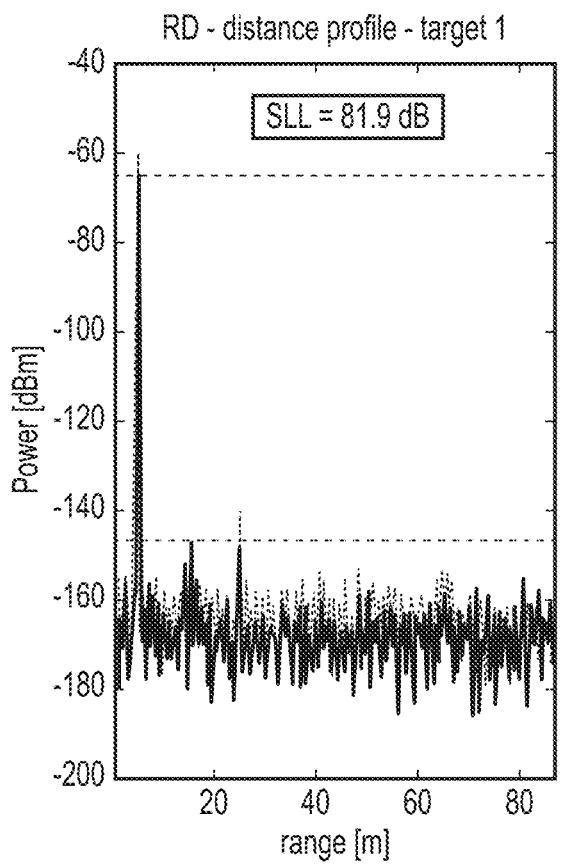
Figure 14E:
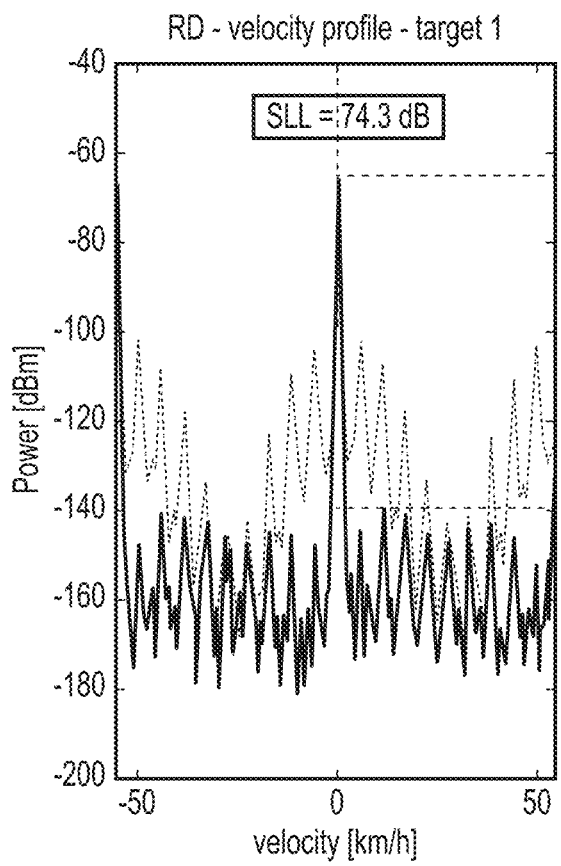

FIG. 14E shows the results when a range-Doppler processed mask is used to deconvolve the range-Doppler map. FIG. 14E shows that the sidelobes are advantageously reduced, when compared to the result of FIG. 14C, from 40.7 dB to 74.3 dB (hence 33.6 dB suppression) in the first target's velocity profile. Also, the number of detections in FIG. 14C (that uses a binary mask but no deconvolution) is 14, whereas the number of detections in FIG. 14E is the correct number of 3. That is, the detection list has been cleaned up by removing the false targets.

Examples disclosed herein recognise that applying a mask (for example by zeroing of fast samples that are identified as including interference) will cause ghost targets at the velocity gates. These ghost targets can be seen as the convolution of a real target at the velocity gates with a kernel that is determined by the mask that indicates where the fast samples are passed (non-interfered samples) and zeroed (interfered samples). To remove the ghost targets, examples of the present disclosure deconvolve the velocity gates in the interference free RD map.

The functionality that is described herein is not limited to the use of binary masks; also masks that make a gradual transition from non-interfered samples to interfered samples, and a gradual transition from interfered samples to non-interfered samples, can be used.

The examples that are described above prove that the described use of deconvolution is very effective on zeroing. However, the presented examples are not only limited to zeroing. They can also be applied to other time-domain mitigation techniques (such as reconstruction, subtraction, etc.). The expected velocity indices can be dependent on the detected mask (kernel), not on the mitigation strategy itself.

A 1D deconvolving method used in the experiments that are described above is a spectral division using two FFTs and a single IFFT operation: a division of the frequency domain translated velocity gates by the frequency domain translated kernel and after division returning back to the original domain. However, the presented idea is not limited to this deconvolving technique. For instance, techniques that avoid the amplification of noise due to the division can also be used. This includes any non-blind 2D deconvolving methods.

Examples disclosed herein relate to the generation of a kernel and its effective deconvolving technique with one or more columns of a range-Doppler map. They can be used as part of a FMCW radar signal processing algorithm.

The proposed solution can exploit the locations where nulling is applied to the beat-frequency samples (the so-called detected binary interference mask) to generate a single kernel. The single kernel can predict at which locations the zeroing-induced velocity ghost detections can appear. After a conventional range-Doppler map has been retrieved, a deconvolution with that kernel can be applied along a single velocity profile. The deconvolution output will have significant improved peak-to-sidelobe ratio at the velocity gates. This will reduce the false alarms with high probability.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/ method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A method of processing radar signaling, the method comprising:
    receiving the radar signaling, wherein the radar signaling comprises a first matrix of data having a first dimension and a second dimension, wherein the first dimension represents a fast-time axis and the second dimension represents a slow-time axis;
    receiving a mask that represents samples in the radar signaling that are detected as including interference, wherein the mask comprises a second matrix of data having the first dimension and the second dimension, wherein the first dimension represents the fast-time axis and the second dimension represents the slow-time axis;
    applying the second matrix for the mask to the first matrix of the radar signaling in order to provide interference-reduced-radar-signaling, wherein the interference-reduced-radar-signaling comprises a third matrix of data having the first dimension and the second dimension, wherein the first dimension represents the fast-time axis and the second dimension represents the slow-time axis;
    performing frequency analysis on the third matrix for the interference-reduced-radar-signaling across each of the fast-time axis and the slow-time axis in order to provide a range-Doppler map of the interference-reduced-radar signaling;
    performing frequency analysis on the second matrix for the mask across each of the fast-time axis and the slow-time axis of the mask in order to provide a range-Doppler processed mask; and
    deconvolving the range-Doppler map of the interference-reduced-radar-signaling using the range-Doppler processed mask in order to provide a deconvolved-range-Doppler map.

2. The method of claim 1, wherein performing the frequency analysis on the second matrix for the mask across the fast-time axis results in a range-processed-mask that has a first dimension and a second dimension, wherein the first dimension represents a distance axis and the second dimension represents the slow-time axis.

3. The method of claim 2, wherein performing the frequency analysis on the second matrix for the mask across the slow-time axis comprises performing the frequency analysis on the range-processed-mask for only a subset of the indices of the distance axis.

4. The method of claim 3, wherein the size of the subset is set according to a design parameter.

5. The method of claim 3, wherein the size of the subset is one, three or five indices of the distance axis.

6. The method of claim 1, wherein performing the frequency analysis comprises the following steps, which can be performed in either order:
  applying a Fourier transform across the fast-time axis; and
  applying a Fourier transform across the slow-time axis.

7. The method of claim 6, wherein performing the frequency analysis comprises:
  applying a Fourier transform across the fast-time axis; and then
  applying a Fourier transform across the slow-time axis.

8. The method of claim 1, further comprising:
  processing the second matrix for the mask to determine if there are at least a predetermined number of samples that include interference; and
  only continuing to perform the steps of performing frequency analysis on the second matrix for the mask and deconvolving the range-Doppler map if there are at least a predetermined number of samples that include interference.

9. The method of claim 1, further comprising:
  processing the radar signaling to determine the second matrix for the mask.

10. The method of claim 1, wherein the mask is a Fading-in Fading-out mask or a binary mask.

11. The method of claim 1, wherein deconvolving the range-Doppler map comprises applying a one-dimensional or a two-dimensional deconvolution.

12. The method of claim 1, wherein deconvolving the range-Doppler map comprises applying a spectral dimensional deconvolution.

13. A computer program configured to perform a method of processing radar signaling comprising:
  receiving the radar signaling, wherein the radar signaling comprises a first matrix of data having a first dimension and a second dimension, wherein the first dimension represents a fast-time axis and the second dimension represents a slow-time axis;
  receiving a mask that represents samples in the radar signaling that are detected as including interference, wherein the mask comprises a second matrix of data having the first dimension and the second dimension, wherein the first dimension represents the fast-time axis and the second dimension represents the slow-time axis;
  applying the second matrix of the mask to the first matrix of the radar signaling in order to provide interference-reduced-radar-signaling, wherein the interference-reduced-radar-signaling comprises a third matrix of data having the first dimension and the second dimension, wherein the first dimension represents the fast-time axis and the second dimension represents the slow-time axis;
  performing frequency analysis on the third matrix for the interference-reduced-radar-signaling across each of the fast-time axis and the slow-time axis in order to provide a range-Doppler map of the interference-reduced-radar signaling;
  performing frequency analysis on the second matrix for the mask across each of the fast-time axis and the slow-time axis of the mask in order to provide a range-Doppler processed mask; and
  deconvolving the range-Doppler map of the interference-reduced-radar-signaling using the range-Doppler processed mask in order to provide a deconvolved-range-Doppler map.

14. A processor configured to:
  receive radar signaling, wherein the radar signaling comprises a first matrix of data having a first dimension and a second dimension, wherein the first dimension represents a fast-time axis and the second dimension represents a slow-time axis;
  receive a mask that represents samples in the radar signaling that are detected as including interference, wherein the mask comprises a second matrix of data having the first dimension and the second dimension, wherein the first dimension represents the fast-time axis and the second dimension represents the slow-time axis;
  apply the second matrix of the mask to the first matrix of the radar signaling in order to provide interference-reduced-radar-signaling, wherein the interference-reduced-radar-signaling comprises a third matrix of data having the first dimension and the second dimension, wherein the first dimension represents the fast-time axis and the second dimension represents the slow-time axis;
  perform frequency analysis on the third matrix for the interference-reduced-radar-signaling across each of the fast-time axis and the slow-time axis in order to provide a range-Doppler map of the interference-reduced-radar signaling;
  perform frequency analysis on the second matrix for the mask across each of the fast-time axis and the slow-time axis of the mask in order to provide a range-Doppler processed mask; and
  deconvolve the range-Doppler map of the interference-reduced-radar-signaling using the range-Doppler processed mask in order to provide a deconvolved-range-Doppler map.

15. The processor of claim 14, wherein the processor is further configured to perform the frequency analysis on the second matrix for the mask across the fast-time axis which results in a range-processed-mask that has a first dimension and a second dimension, wherein the first dimension represents a distance axis and the second dimension represents the slow-time axis.

16. The processor of claim 15, wherein the processor is further configured to perform the frequency analysis on the second matrix for the mask across the slow-time axis by performing the frequency analysis on the range-processed-mask for only a subset of the indices of the distance axis.

17. The processor of claim 14, wherein the processor is further configured to perform the frequency analysis by applying a Fourier transform across the fast-time axis and applying a Fourier transform across the slow-time axis.

18. The processor of claim 14, wherein the processor is further configured to:
  process the second matrix for the mask to determine if there are at least a predetermined number of samples that include interference; and
  perform frequency analysis on the second matrix for the mask and deconvolve the range-Doppler map if there is at least a predetermined number of samples that include interference.

19. The method of claim 10, wherein:
  in the third matrix for the interference-reduced-radar-signaling, samples that are detected as including interference have reduced amplitudes compared with corresponding samples in the first matrix for the radar signaling;

the mask is the binary mask; and the reduced amplitudes are zero for all of the samples in the radar signaling that are detected as including interference.

20. The method of claim 10, wherein:

in the third matrix for the interference-reduced-radar-signaling, samples that are detected as including interference have reduced amplitudes compared with corresponding samples in the first matrix for the radar signaling;

the mask is the Fading-in Fading-out mask; and the reduced amplitudes are greater than zero for at least some of the samples in the radar signaling that are detected as including interference.

* * * * *